US008237129B2

(12) United States Patent
Sullivan et al.

(10) Patent No.: US 8,237,129 B2
(45) Date of Patent: Aug. 7, 2012

(54) MICROCHANNEL PLATE DEVICES WITH TUNABLE RESISTIVE FILMS

(75) Inventors: Neal T. Sullivan, Lunenburg, MA (US); Anton Tremsin, Lafayette, CA (US); Philippe de Rouffignac, Cambridge, MA (US); David Beaulieu, Groton, MA (US); Kourosh Saadatmand, Merrimac, MA (US); Steve Bachman, North Attleboro, MA (US); Ken Stenton, Saint James, NY (US); Dmitry Gorelikov, Ashland, MA (US)

(73) Assignee: Arradiance, Inc., Sudbury, MA (US)

( * ) Notice: Subject to any disclaimer, the term of this patent is extended or adjusted under 35 U.S.C. 154(b) by 0 days.

(21) Appl. No.: 12/392,064

(22) Filed: Feb. 24, 2009

(65) Prior Publication Data

US 2010/0044577 A1    Feb. 25, 2010

Related U.S. Application Data

(63) Continuation-in-part of application No. 12/143,732, filed on Jun. 20, 2008.

(51) Int. Cl.
*G01T 3/00* (2006.01)
(52) U.S. Cl. ................................. 250/390.01
(58) Field of Classification Search ........ 250/390.01–390.12; 313/103 CM, 313/103 R, 105 CM
See application file for complete search history.

(56) References Cited

U.S. PATENT DOCUMENTS

| | | | |
|---|---|---|---|
| 4,051,403 A * | 9/1977 | Feingold et al. ....... | 313/105 CM |
| 4,339,659 A | 7/1982 | Johnson | |
| 4,381,454 A * | 4/1983 | Griffith et al. ............ | 250/472.1 |
| 4,383,179 A * | 5/1983 | Eisen et al. ............... | 250/472.1 |
| 4,555,731 A | 11/1985 | Zinchuk | |
| 4,780,395 A | 10/1988 | Saito et al. | |
| H000590 H * | 2/1989 | Chiles et al. .................. | 250/367 |
| 4,853,020 A | 8/1989 | Sink | |
| 4,912,314 A | 3/1990 | Sink et al. | |
| 4,954,707 A * | 9/1990 | Miller et al. .................. | 250/337 |
| 5,159,430 A | 10/1992 | Manning et al. | |
| 5,205,902 A | 4/1993 | Horton et al. | |
| 5,319,189 A | 6/1994 | Beauvais et al. | |
| 5,378,960 A * | 1/1995 | Tasker et al. ........... | 313/103 CM |
| 5,565,729 A * | 10/1996 | Faris et al. ............. | 313/103 CM |
| 5,659,177 A | 8/1997 | Schulte et al. | |
| 5,726,076 A | 3/1998 | Tasker et al. | |

(Continued)

OTHER PUBLICATIONS

I. P. Csorba, "Current gain parameters of microchannel plates," Nov. 15, 1980, Applied Optics, vol. 19, No. 22, pp. 3863-3866.*

(Continued)

*Primary Examiner* — Kiho Kim
(74) *Attorney, Agent, or Firm* — Kurt Rauschenbach; Rauschenbach Patent Law Group, LLP

(57) ABSTRACT

A microchannel plate for detecting neutrons includes a hydrogen-rich polymer substrate that defines a plurality of channels extending from a top surface of the substrate to a bottom surface of the substrate, where neutrons interact with the plurality of channels to generate at least one secondary electron. A top electrode is positioned on the top surface of the substrate and a bottom electrode is positioned on the bottom surface of the substrate. A resistive layer is formed over an outer surface of the plurality of channels that provides ohmic conduction with a resistivity that is substantially constant. An emissive layer is formed over the resistive layer. Neuron interaction products interact with the plurality of channels defined by the substrate and the emissive films to generate secondary electrons that cascade within the plurality of channels to provide an amplified signal related to the detection of neutrons.

33 Claims, 13 Drawing Sheets

U.S. PATENT DOCUMENTS

| | | | |
|---|---|---|---|
| 5,997,713 | A | 12/1999 | Beetz, Jr. et al. |
| 6,268,229 | B1 | 7/2001 | Brandes et al. |
| 6,452,184 | B1 | 9/2002 | Taskar |
| 6,492,657 | B1* | 12/2002 | Burlefinger et al. ............ 257/10 |
| 6,522,061 | B1 | 2/2003 | Lockwood |
| 6,930,059 | B2 | 8/2005 | Conley, Jr. et al. |
| 6,943,344 | B2 | 9/2005 | Cornish et al. |
| 6,946,197 | B2 | 9/2005 | Yadav et al. |
| 7,097,526 | B2 | 8/2006 | Raina et al. |
| 7,164,138 | B2 | 1/2007 | McGregor et al. |
| 7,235,854 | B2 | 6/2007 | Ahn et al. |
| 7,271,389 | B2 | 9/2007 | August et al. |
| 7,333,701 | B1* | 2/2008 | Feller et al. ................... 385/123 |
| 7,365,027 | B2 | 4/2008 | Ahn et al. |
| 2002/0021064 | A1 | 2/2002 | Devoe |
| 2002/0088714 | A1 | 7/2002 | Motoi et al. |
| 2003/0015661 | A1* | 1/2003 | Lee et al. ................... 250/315.3 |
| 2003/0214236 | A1 | 11/2003 | Kaoet et al. |
| 2005/0184249 | A1 | 8/2005 | Suzuki |
| 2005/0200254 | A1* | 9/2005 | Heo et al. .................. 313/103 R |
| 2006/0078679 | A1 | 4/2006 | Elers et al. |
| 2010/0001193 | A1* | 1/2010 | Feller et al. ................... 250/366 |

OTHER PUBLICATIONS

Ambrosi et al., "Design of a protype microchannel plate detector with cooled amorphous silicon array readout for neutron radiography," 2005, Nuclear Instruments and Methods in Physics Research A, vol. 542. pp. 271-278.*

Berkin et al., "Mathematical Modeling of amplification MCP current by methods of the theory of electrical circuits," 2005, SPIE Proceedings, vol. 5834, pp. 218-277.*

D. W. MacArthur, "A neutron detector based on microchannel plates," Jun. 1987, downloaded from www.osti.gov/bridge/servlets/purl/6215140-V3hPLe/.*

Wisniewski et al., "Channel electron multipliers constructed of polymers," 1984, Journal of Physics D: Applied Physics, vol. 17, pp. 1905-1912.*

Leake, J.W., et al., Optimizing 3He Tube Design for Various Operational Conditions: A Review of the Design Parameters of 3HE Gas Proportional Counters Used for Neutron Detection, pp. 1-12.

Rinard, P., Neutron Interactions With Matter. pp. 357-377.

Scintillation Products, Jul. 2002, Saint-Gobain Ceramics & Plastics.

"Notification of Transmittal of the International Search Report and the Written Opinion of the International Searching Authority, or the Declaration" for PCT/US09/035017, Korean Intellectual Property Office, Jan. 11, 2010, 14 pages, Seo-gu, Republic of Korea.

Elam, Jeffrey W., et al., Atomic Layer Deposition for the Conformal Coating of Nanoporous Materials, Journal of Nanomaterials, 2006, pp. 1-5, vol. 2006, Hindawi Publishing Corporation.

Austin, I. G., et al., Metallic and Nonmetallic Behavior in Transition Metal Oxides, Science, Apr. 3, 1970, pp. 71-77, vol. 168.

Elam, J.W., et al., Properties of ZnO/A1203 Alloy Films Grown Using Atomic Layer Deposition Techniques, Journal of the Electrochemical Society, 2003, pp. G339-G347, vol., 150, No. 6, The Electrochemical Society, Inc.

Elam, J.W., et al., ZnO/A1203 Nanolaminates Fabricated by Atomic Layer Deposition: Growth and Surface Roughness Measurements, Thin Solid Films, 2002, pp. 43-55, vol. 414, Elsevier.

Greer, Metallic Glasses, Frontiers in Materials Science: Articles, Mar. 31, 1995, pp. 1947-1953, vol. 267.

Kovalevskii, et al., Electrical Behavior of In Situ Doped Polysilicon Films As Influenced by the Dopants, Russian Microelectronics, 2005, pp. 140-146, vol. 34, No. 3.

Mott, Electrons in Glass, Science, Sep. 8, 1978, pp. 871-875, vol. 201, No. 4359, AAAS.

Noh, et al., A Study of Electrical Properties and Microstructure of Nitrogen-Doped Poly-SiC Films Deposited by LPCVD, Sensors and Actuators A., 2007, pp. 613-617, vol. 136 Elsevier.

Temple-Boyer, et al., Properties of Nitrogen Doped Silicon Films Deposited by Low Pressure Chemical Vapour Deposition From Disilane and Ammonia, Thin Solid Films, 2002, pp. 13-17, vol. 414, Elsevier.

"Notification of Transmittal of the International Search Report and The Written Opinion of the International Searching Authority, or the Declaration" for PCT/US09/047977, International Searching Authority, Apr. 23, 2010, 11 pages, Seo-gu, Daejeon, Republic of Korea.

"Notification of Transmittal of the International Search Report and The Written Opinion of the International Searching Authority, or the Declaration" for PCT/US09/047950, International Searching Authority, Apr. 21, 2010, 11 pages, Seo-gu, Daejeon, Republic of Korea.

"Notification Concerning Transmittal of International Preliminary Report on Patentability (Chapter I of the Patent Cooperation Treaty)" for PCT/US09/035012, International Bureau of WIPO, Sep. 10, 2010, 7 pages, Geneva, Switzerland.

"Notification Concerning Transmittal of International Preliminary Report on Patentability (Chapter I of the Patent Cooperation Treaty)" for PCT/US09/035017, International Bureau of WIPO, Sep. 10, 2010, 9 pages, Geneva, Switzerland.

"Notification Concerning Transmittal of International Preliminary Report on Patentability (Chapter I of the Patent Cooperation Treaty)" for PCT/US09/047977, Jan. 6, 2011, 6 pages, The International Bureau of WIPO, Geneva, Switzerland.

"Notification Concerning Transmittal of International Preliminary Report on Patentability (Chapter I of the Patent Cooperation Treaty)" for PCT/US09/047950, Jan. 6, 2011, 6 pages, The International Bureau of WIPO, Geneva, Switzerland.

Notification Concerning Transmittal of International Preliminary Report on Patentability (Chapter I of the Patent Cooperation Treaty) for PCT/US2009/040127, Oct. 21, 2010, 8 Pages, The International Bureau of WIPO, Geneva, Switzerland.

* cited by examiner

MICROCHANNEL PLATE DEVICES WITH TUNABLE RESISTIVE FILMS

CROSS-REFERENCE TO RELATED APPLICATIONS

The present application is a continuation-in-part of copending U.S. patent application Ser. No. 12/143,732, filed on Jun. 20, 2008. The entire contents U.S. patent application Ser. No. 12/143,732 is herein incorporated by reference.

FEDERAL RESEARCH STATEMENT

This invention was made with Government support under Grant Number HR0011-05-9-0001 awarded by the Defense Advanced Research Projects Agency (DARPA). The Government has certain rights in this invention.

BACKGROUND OF THE INVENTION

Microchannel plates (MCPs) are used to detect very low fluxes (down to single event counting) including ions, electrons, photons, neutral atoms, and neutrons. For example, microchannel plates are commonly used as electron multipliers in image intensifying devices. A microchannel plate is a slab of high resistance material having a plurality of tiny tubes or slots, which are known as pores or microchannels, extending through the slab. The microchannels are parallel to each other and may be positioned at a small angle to the surface. The microchannels are usually densely packed. A high resistance layer and a layer having high secondary electron emission efficiency are formed on the inner surface of each of the plurality of channels so that it functions as a continuous dynode. A conductive coating is deposited on the top and bottom surfaces of the slab comprising the microchannel plate.

In operation, an accelerating voltage is applied between the conductive coatings on the top and bottom surfaces of the microchannel plate. The accelerating voltage establishes a potential gradient between the opposite ends of each of the plurality of channels. Ions and/or electrons traveling in the plurality of channels are accelerated. These ions and electrons collide against the high resistance outer layer of the pore having high secondary electron emission efficiency, thereby producing secondary electrons. The secondary electrons are accelerated and undergo multiple collisions with the emissive layer. Consequently, electrons are multiplied inside each of the plurality of channels. The electrons eventually leave the channel at the output end of each of the plurality of channels. The electrons can be detected or can be used to form images on an electron sensitive screen, such as a phosphor screen or on a variety of analog and digital readouts.

BRIEF DESCRIPTION OF THE DRAWINGS

The invention, in accordance with preferred and exemplary embodiments, together with further advantages thereof, is more particularly described in the following detailed description, taken in conjunction with the accompanying drawings. The drawings are not necessarily to scale, emphasis instead generally being placed upon illustrating principles of the invention.

DETAILED DESCRIPTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

The present teachings are described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teachings herein will recognize additional implementations, modifications, and embodiments, as well as other fields of use, which are within the scope of the present disclosure as described herein.

Figure 1A:
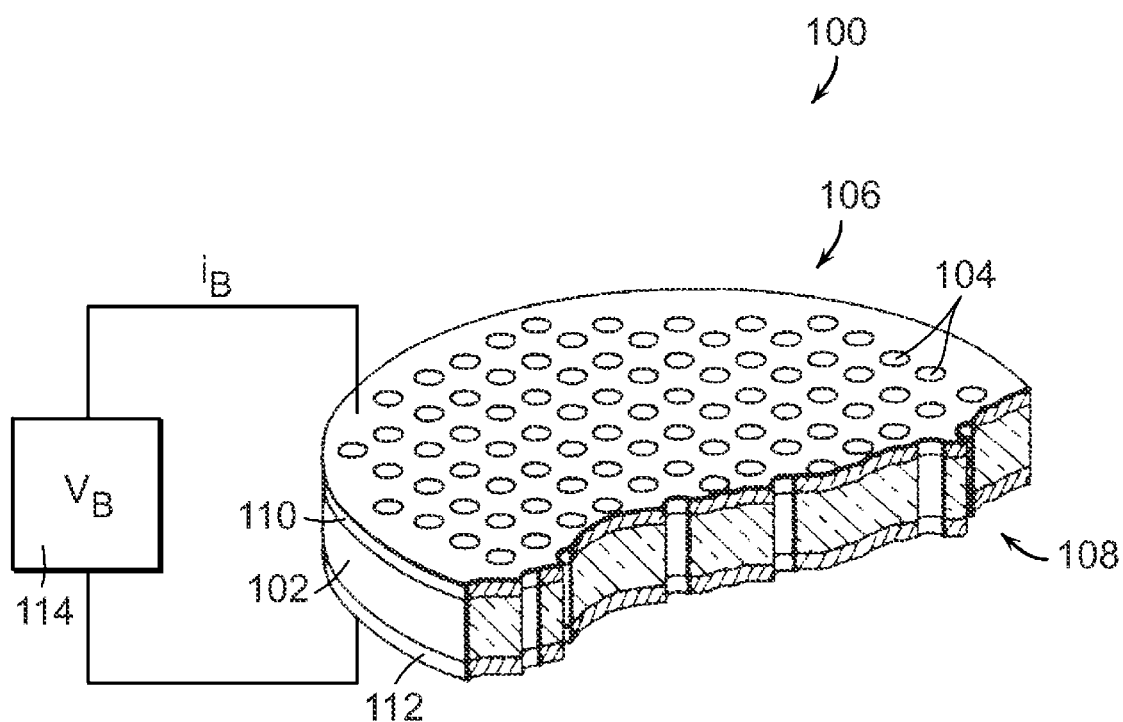
FIG. 1A illustrates a perspective view of a cross section of a microchannel plate according to the prior art.

FIG. 1A illustrates a perspective view of a cross section of a microchannel plate 100 according to the prior art. The microchannel plate 100 includes a substrate 102 that defines a plurality of pores or microchannels 104 extending from a top surface 106 of the substrate 102 to a bottom surface 108 of the substrate 102. The top surface 106 is coated with electrode material 110. The bottom surface is coated with electrode material 112. The electrode materials 110, 112 are conductive coatings that provide an electron transport medium for generating an electric field that enables cascade amplification of electrons. The microchannels 104 are hollow channels, which may be cylindrical, with channel densities that are on order of $10^6/cm^2$ or higher.

In operation, the microchannels 104 are evacuated to pressures that are less than or equal to about $1\times10^{-5}$ Torr and biased by an external power supply 114. The microchannels support the generation of large electron avalanches in response to a suitable input signal. The electron multiplication process does not critically depend on either the absolute diameter (D) or length (L) of the channel, but rather on the ratio of L/D, which is sometimes referred to as $\alpha$. This geometric ratio largely determines the average number of collisions (and its distribution) with the pore walls (n) for the electrons forming an avalanche. However, MCPs with smaller channel diameters tend to have slightly smaller gain than MCPs with larger channels diameters and the same L/D ratio. Typical values of $\alpha$ range from 30 to 80 for conventional MCPs with channel diameters D on the order of 2-12.5 μm.

Figure 1B:
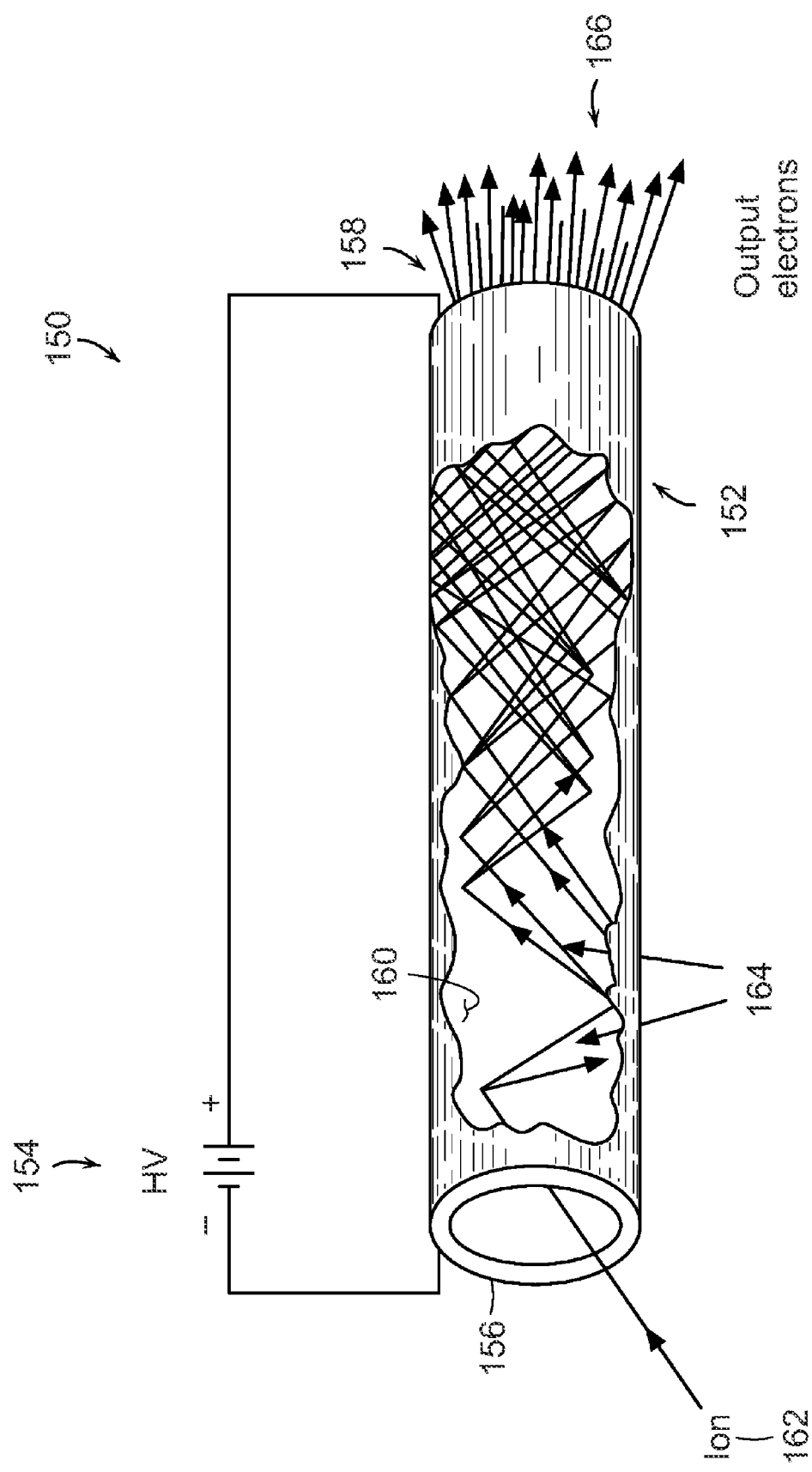
FIG. 1B illustrates a perspective view of a single channel of a microchannel plate according to the prior art.

FIG. 1B illustrates a perspective view of a single channel of a microchannel plate (MCP) 150 according to the prior art. The channel 152 includes dynode 160 that performs electron multiplication. The operation of the MCP 150 is similar to the operation of photo-emissive detectors using discrete dynodes (e.g., an ordinary photomultiplier tube). In operation, the dynode 160 must be sufficiently resistive to support a biasing electric field $(\in)=10^2-10^5$ V/cm without drawing excessive current. The dynode 160 must also be conductive enough so that a resistive layer (or strip) current is available to replenish electrons emitted from the dynode 160 during an electron avalanche. For example, when a signal event 162, such as an electrically charged particle (e.g., an electron or an ion), neutral atom/molecule or sufficiently energetic radiation (e.g., an X-ray or UV photon), strikes the dynode 160 near the negatively biased input end 156, there is a good probability that secondary electrons 164 will be ejected from the surface 160. These secondary electrons 164 are accelerated down the channel defined by the dynode 160 by an applied electric field $\in$ produced by the bias potential $(V_B)$ represented by the power supply 154. The applied electric field $\in=V_B/L$, where $V_B$ in volts is about $20-25\alpha$ for a conventional straight-channel MCP.

Collisions of the emitted secondary electrons 164 with the dynode 160 cause the emission of additional secondary electrons 164. These secondary electrons subsequently collide with the dynode 160, thereby producing another set of secondary electrons. An output electron avalanche 166 of magnitude δn is achieved provided that on average more than one secondary electron is emitted for every incident primary electron, e.g. secondary electron yield (δ)>1, and n repetitions of this primary collision-secondary emission sequence in the direction of the output end 158.

Figure 1C:
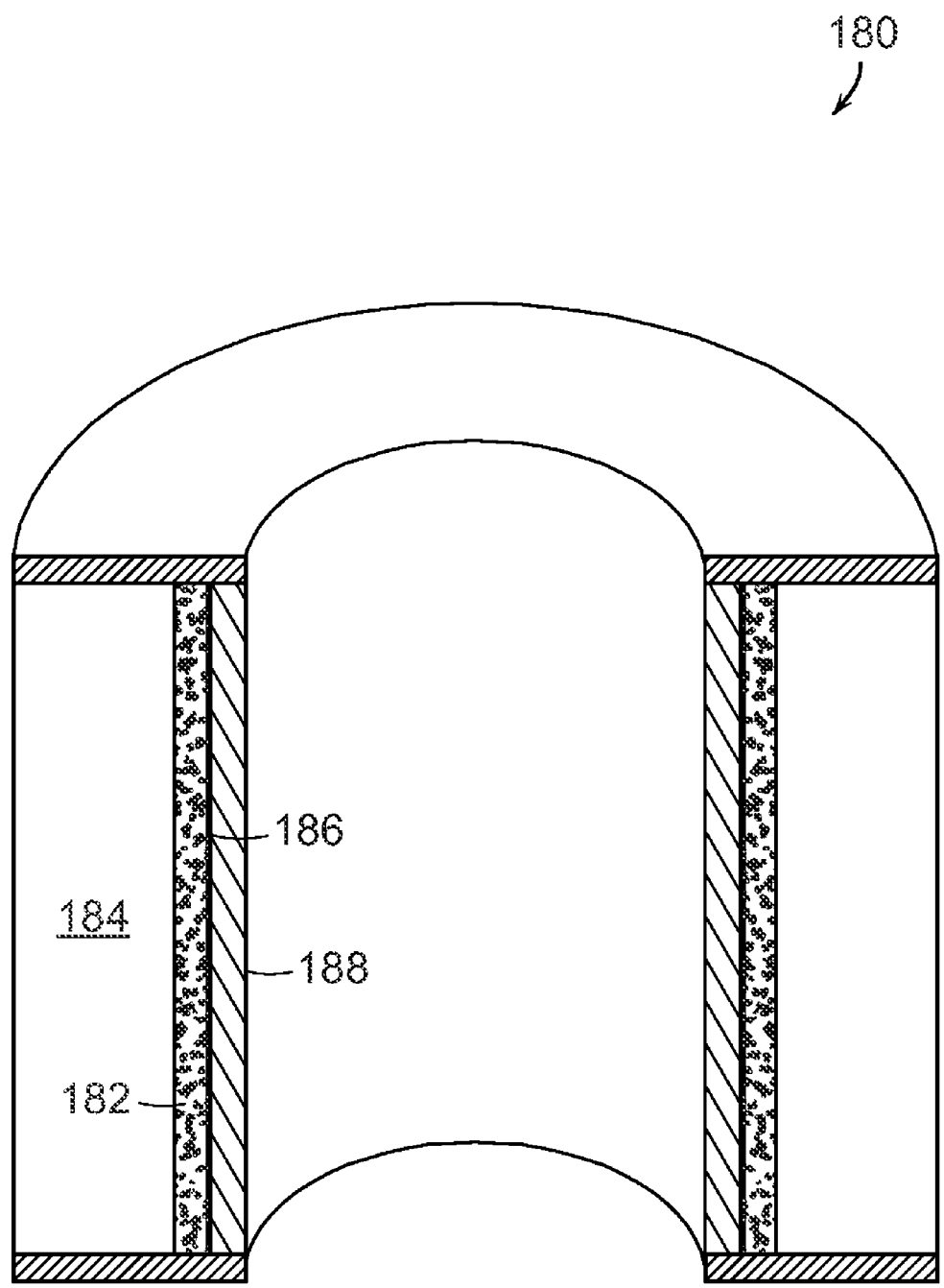
FIG. 1C illustrates a cross section of a single channel of a microchannel plate according to the prior art.

FIG. 1C illustrates a cross section of a single channel 180 of a microchannel plate according to the prior art. A resistive layer 182 is formed on the outer surface of glass channel material 184. The glass channel material 184 provides mechanical support for the channel 180 in the geometry of arrays of microscopic channels within the MCP. The resistive layer 182 functions as an electronically conductive path for both discharging the emissive layer and supporting the electric fields required for the cascade amplification. An interface layer 186 is shown to illustrate the transition from the resistive layer 182 to the emissive layer 188. A superficial silica-rich and alkali-rich (but lead-poor) dielectric emissive layer 188 (or dynode surface) that is about 2-20 nm in thickness is formed over the resistive layer 182. The emissive layer 188 produces adequate secondary emission to achieve useful electron multiplication.

Calculations indicate that a reduced lead silicate glass (RLSG) dynode including channels 180 must have a bulk electrical resistivity that is in the range of $10^6-10^9$ Ωcm in order to have proper operation assuming the resistive layer 182 has a thickness t=100 nm. Single channel electron multipliers (CEM), which are similar in construction and operation to the MCP, use only a single electron multiplication channel. This results in a resistive requirement for the CEM that is reduced by six orders of magnitude.

The microchannel plate 100 is typically manufactured using a glass multifiber draw (GMD) process. In the GMD process, individual composite fibers, consisting of an etchable core glass and an alkali lead silicate cladding glass, are formed by drawdown of a rod-in-tube perform. The rod-in-tube performs are then packed together in a hexagonal or rectangular array. This array is then redrawn into hexagonal/rectangular multifiber bundles, which are stacked together and fused within a glass envelope to form a solid billet. The solid billet is then sliced, typically at a small angle of approximately 4°-15° from the normal to the fiber axes.

Individual slices are then polished into a thin plate. The soluble core glass is removed by a chemical etchant, resulting in an array of microscopic channels with channel densities of $10^5-10^7/cm^2$. Further chemical treatments, followed by a hydrogen reduction process, produces the resistive and emissive surface properties required for electron multiplication within the microscopic channels. Metal electrodes 110 and 112 are thereafter deposited on the faces of the wafer to complete the manufacture of a microchannel plate. An alternative manufacturing technique performs the draw process on the clad glass only, without core glass. This technique eliminates the need to etch the latter on the final stages.

The hydrogen reduction step is critical for the operation of prior art MCP devices and determines both the resistive and the emissive properties of the continuous dynode. Lead cations in the near-surface region of the continuous glass dynode are chemically reduced, in a hydrogen atmosphere at temperatures of 350°-650° C., from the $Pb^2$ state to lower oxidation states with $H_2O$ as a reaction by-product. This process results in the development of significant electrical conductivity within a submicron distance to the surface of the RLSG dynode. The physical mechanism responsible for the conductivity is not well understood but is believed to be due to either an electron hopping mechanism via localized electronic states in the band gap or a tunneling mechanism between discontinuous islands of metallic lead within the RLSG film.

The observed electrical conductivity is ohmic in nature and is similar to the conductivity of a metal due to the observed material properties. The term "ohmic" means that the electrical conductivity follows Ohm's law where the resistance is substantially constant as a function of applied voltage. For example, the Temperature Coefficient of Resistance (TCR) is typically less than 1% per degree C. Also, there is an insensitivity of resistance to applied external electric field and a stability of resistance with applied bias that is observed in common metals. The presence of ohmic conduction is essential for stable MCP device operation. The resulting RLSG dynode exhibits an electrically conductive surface with a nominal sheet resistance of $10^{14}$ $\Omega$/sq. It is known in the art that the electrical characteristics of RLSG dynodes represent a complex function of the chemical and thermal history of the glass surface as determined by the details of its manufacture.

During hydrogen reduction, other high-temperature processes, such as diffusion and evaporation of mobile chemical species in the lead silicate glass (e.g., alkali alkaline earth, and lead atoms), act to modify the chemistry and structure of RLSG dynodes. Materials analysis of the near-surface region the microchannel surface of MCPs has indicated that RLSG dynodes have a two-layer structure including a resistive layer and an emissive layer as described in connection with FIG. 1C.

The RLSG manufacturing technology is mature and results in the fabrication of relatively inexpensive and high performance devices. However, the RLSG manufacturing technology has certain undesirable limitations. For example, both electrical and electron emissive properties of RLSG dynodes are quite sensitive to the chemical and thermal history of the glass surface comprising the dynode. Therefore, reproducible performance characteristics for RLSG MCPs critically depend upon stringent control over complex, time-consuming, and labor-intensive manufacturing operations. In addition, the ability to enhance or tailor the characteristics of RLSG MCPs is constrained by the limited choices of materials which are compatible with the present manufacturing technology. Performance is adversely affected by material limitations of the lead silicate glasses that are used in the manufacture of conventional MCPs. These limitations include gain amplitude and stability, count rate capabilities, maximum processing temperature, maximum operating temperature, background noise, reproducibility, size, shape, and heat dissipation in high-current devices.

The manufacture of microchannel plates according to the GMD process is limited in the choice of materials available. The multifiber drawdown technique requires that the core and cladding starting materials both be glasses with carefully chosen temperature-viscosity and thermal expansion properties. The fused billet must have properties suitable for wafering and finishing. The core material must be preferentially etched over the cladding with very high selectivity. In addition, the clad material must ultimately exhibit sufficient surface conductivity and secondary electron emission properties to function as a continuous dynode for electron multiplication. This set of constraints greatly limits the range of materials suitable for manufacturing MCPs with the present technology.

Most known microchannel plates are fabricated from glass fibers as described herein in connection with FIGS. 1A-1C. See also "Microchannel Plate Detectors," Joseph Wiza, Nuclear Instruments and Methods, Vol. 162, 1979, pages 587-601 for a detailed description of fabricating microchannel plates from glass fibers. Numerous types of substrate materials can be used for the microchannel plate 100.

Recently, silicon has been used as a substrate for microchannel plates. See, for example, U.S. Pat. No. 6,522,061B1 to Lockwood, which is assigned to the present assignee. Silicon microchannel plates have several advantages compared with glass microchannel plates. Silicon microchannel plates can be more precisely fabricated because the channels can be lithographically defined rather than manually stacked like glass microchannel plates. Silicon processing techniques, which are very highly developed, can be applied to fabricating such microchannel plates. Also, silicon substrates are much more process compatible with other materials and can withstand high temperature processing.

In contrast, glass microchannel plates melt at much lower temperatures than silicon microchannel plates. Furthermore, silicon microchannel plates can be easily integrated with other devices. For example, a silicon microchannel plate can be easily integrated with various types of other electronic and optical devices, such as photodetectors, MEMS, and various types of integrated electrical and optical circuits. One skilled in the art will appreciate that the substrate material can be any one of numerous other types of insulating substrate materials.

In one embodiment of the present invention, plastic materials are used to form the microchannel plates. For example, the microchannel plates can be formed of polycarbonate, Kapton, Radel R, and Udel materials. One skilled in the art will appreciate that the microchannel plates can be formed of numerous other polymer and plastic materials. In fact, a wide variety of plastic and polymer materials are available that can be used to form the required geometries of a microchannel plate substrate. For example, hydrogen-rich plastic microchannel devices can be used to fabricate high gain detectors with long operating lifetimes.

Plastic molding processes are well known in the art. There are many plastic manufacturing processes, such as injection molding processes that are suitable for forming microchannel plates. There are also numerous fiber optic multidraw manufacturing processes that can be used to form plastic microchannel plates. Emissive and conductive materials can be formed on the plastic microchannel plates by the low temperature deposition techniques of the present invention. Plastic microchannel plate processes can be relatively inexpensive to implement. The plastic MCPs can also be manufactured with much larger dimensions than the present glass microchannel plates.

In various embodiments, plastic microchannel plates can be used to detect thermal neutrons. The term "thermal neutron" is defined herein as a neutron that is near thermal equilibrium with its surroundings and that exhibit average energies of about 0.025 eV. The interaction between thermal neutrons and specific materials contained in the plastic materials is nuclear and typically produces energetic, heavy, charged particles such as alpha particles In some embodiments, plastic microchannel plates are doped with boron, lithium or gadolinium so that they are sensitive to thermal neutrons. In these plastic microchannel plates, the reaction by-products, such as alpha particles, beta particles, gamma quanta, and Li particles in some cases, generate secondary electrons through interactions with the pore walls. Those secondary electrons cascade within the MCP pore colliding with the emissive film coating the pores of the plastic microchannel plates, thereby providing event detection and signal amplification.

For example, thermal neutrons interact with the Boron-10 isotope, which has a natural abundance of about 19.8% and a thermal neutron reaction cross section of about 3840 barns. The result of the interaction is the production of alpha particles and $^7$Li particles, both with energies in the MeV range.

In addition, thermal neutrons interact with Lithium-6 isotopes, which have a natural abundance of about 7.4%, and a thermal neutron reaction cross section of 940 barns. The result of the interaction is the production of an energetic triton with an energy of about 2.73 MeV and alpha particles with energies that are about 2.05 MeV. In addition, thermal neutrons can efficiently interact with the gadolinium-157 isotope, which has a natural abundance of about 15.7% and a neutron reaction cross section of 225,000 barns. The result of the interaction is the production of gamma rays and conversion electrons.

Plastic microchannel plates can also be used to detect fast neutrons. In one embodiment, the hydrogen-rich polymer substrate comprises between 2-6 weight percent hydrogen. The term "fast neutron" is defined herein as neutrons that have energies greater than 0.5 MeV. The detection of fast neutrons is accomplished through conversion of incoming fast neutrons into a pulse of electrons generated by a neutron-proton (n-p) recoil interaction within the hydrogen-rich polymer microchannel structures. The fast neutrons interact through scattering with atomic nuclei and can transfer an appreciable amount of energy in a single collision. Recoil nuclei have measurable quantities of energy that are gained from the neutron collision. These recoil nuclei produce secondary electrons upon escape from the bulk material comprising the MCP walls and upon interacting with the films deposited onto the pore walls according to methods of the present invention. At each scattering site, the neutron loses energy and is moderated to a lower energy. The most efficient moderator is hydrogen because the neutron can lose up to all of its energy in a single collision with a hydrogen nucleus (proton).

Plastic microchannel plate devices for detecting fast neutrons can be fabricated from plastic materials comprising hydrogen and deposited with the thin film emissive and conductive materials as described herein. Such plastic microchannel plate fast neutron detectors have relatively low background noise and relatively high efficiency with timing resolutions that are below 10 ns for fast neutrons. In addition, such plastic microchannel plate fast neutron detectors can be relatively inexpensive to manufacture.

Plastic microchannel plate devices for detecting fast neutrons according to the present invention will generate protons from neutron-proton (n-p) recoil reaction that will excite secondary electrons when they interact with the walls of the microchannel structure. The secondary electrons will be subsequently amplified within the pore using the amplification process supported by the bias across the resistive film component. The resulting signal generated by such devices can be easily detected by a large variety of available instrument technologies, such as resistive anode, cross delay line anode, cross-strip anode as well as readout Application Specific Integrated Circuits (ASICs). One of the latter devices is known in the art as the Medipix II.

Plastic microchannel plate devices for detecting fast neutrons according to the present invention enables the potential for direct detection of fast neutrons with the very low dark counting rates (<0.01 counts/cm2/s) which are characteristic of microchannel plate detectors. These microchannel plate devices can also be used in conjunction with coincidence techniques to greatly increase the gamma rejection ratio and to provide neutron directional sensitivity enabling localization and fast neutron counting in the presence of relatively large gamma background.

Also, U.S. Pat. No. 5,378,960 entitled "Thin Film Continuous Dynodes For Electron Multiplication" to Tasker teaches that the current carrying layer of the RLSG dynode of prior art MCP devices can be replaced with a semiconducting, current carrying layer, such as a Si or Ge semiconductor layer, doped semiconductors (P-doped Si), silicon-oxides ($SiO_x$) or silicon nitrides ($Si_xN_y$). U.S. Pat. No. 5,378,960 also describes that the MCP current carrying layer must have a resistivity in the range of $10^6$-$10^9$ Ω-cm for nominal 100 nm films, which corresponds to a sheet resistance of $10^{11}$-$10^{14}$ Ω/sq. This value of sheet resistance is necessary in order to sustain the MCP bias voltage, which for an L/D of 40:1 must be about 1,000V, with optimized current draw so that the device can be recharged with sufficient speed without excess power dissipation. In fact, commercially available MCP devices, such as those used in charged particle detectors and image intensifier tubes require the sheet resistances to be greater than $10^{14}$ Ω/sq for many applications.

The resistivity of pure Si is about $2.3 \times 10^5$ Ω-cm assuming the maximum possible resistance value for the pure semiconducting materials as the value obtained with the intrinsic carrier concentration (e.g. undoped). Similarly, the resistivity of pure Ge is about 47 Ω-cm assuming the maximum possible resistance value for the pure semiconducting materials as the value obtained with the intrinsic carrier concentration (e.g. undoped). Thus, the maximum sheet resistance for an MCP device (assuming a minimum, viable, film thickness of 100 nm) is $5.8 \times 10^{10}$ Ω/sq for Si and is $2 \times 10^7$ Ω/sq for Ge, which are both several orders of magnitude below the sheet resistance required for stable MCP operation. By stable operation we mean an operating mode where the MCP is not generating excess Joule heat that causes thermal runaway due to a negative temperature coefficient of resistance. Consequently, these Si and Ge films are suited only for the CEM class of electron multipliers.

Another fundamental limitation on the use of semiconducting thin films as the current carrying layer for CEMs and MCPs is the susceptibility of these thin films to electric fields. Applying an electric field transverse to the direction of current conduction results in a characteristic which is similar to that of the field effect transistors (FETs). The field effect in CEMs and MCPs devices causes modulation of the conductivity of the semiconducting layer due to the external applied field. More specifically, during the operation of a MCP channel, positive charge builds up on the emissive film surface due to the departure of secondary electrons during the amplification cascade process. This positive charge sets up a relatively strong electric field across the thin emissive film which serves to decrease the resistance of the underlying, intrinsic current carrying layer, by increasing the concentration of carriers (electrons) at the interface between the resistive layer and the emissive layer (shown as the interface 186 FIG. 1C). This effect is readily measured in MCP devices including a resistive layer formed of a semiconducting material by observing changes in the current which flows through the device as a function of applied input. The field effect in semiconductors results in a device resistance that is not stable. This instability in the device resistance is independent of doping levels.

The increased carrier concentration can result in a resistance decrease of several orders of magnitude within the current carrying layer. Semiconducting films also show large values of resistance change with temperature or Temperature Coefficient of Resistance (TCR). For intrinsic Si, the TCR is as high as 8% per degree C as compared with less than 1% per degree C. for the RLSG films found in prior art glass MCP devices. The low maximum resistance of the semiconducting films, which can be four orders of magnitude below prior art glass MCPs, and the high resulting current draw when combined with the field effect, which in MCP operation results in a further lowering of the layer resistance and an increase in current draw, results in an MCP device that will not function with a stable resistance. Such an MCP may experience thermal runaway due to the relatively high Joule heating that is positively reinforced in localized areas by the high negative value of the TCR. Thus, for these reasons, the semiconducting films are not suitable for the MCP device.

Also, U.S. Pat. No. 5,378,960 describes the use of oxides and nitrides of semiconductors as a conduction layer. Conduction within oxides and nitrides of semiconductors, such as $SiO_x$ and $Si_xN_y$ is achieved through one of four mechanisms: Fowler-Nordhiem tunneling; Poole-Frenkel conduction; space charge limited conduction; and ballistic transport. Space charge limited conduction and ballistic transport cannot occur in MCP devices because they require very high currents (space charge $\sim V^2$) or very high fields (ballistic $\sim V^{1.5}$).

It is well known that electrons can travel through a thin $SiO_2$ film by means of direct tunneling or Fowler-Nordheim (F-N) tunneling. Direct tunneling indicates the presence of a trapezoidal potential barrier whereas F-N tunneling takes place when electrons tunnel through a potential barrier, which is triangular in shape. Direct tunneling requires an extremely thin dielectric layer in the direction of the applied field of about 4 nm or less for $SiO_2$. In MCPs, the effective thickness of the conduction layer in the direction of the applied field is typically several hundred microns. A large electric field is typically needed for F-N tunneling in order to transform a rectangular potential barrier to a triangular potential barrier. Therefore, Fowler-Nordheim tunneling usually dominates in relatively high electric fields while direct tunneling is the main conduction mechanism for thin films in low electric fields.

The Frenkel-Poole effect has also been observed in $SiO_2$ even through tunneling is considered to be mainly responsible for charge transport in $SiO_2$. The Frenkel-Poole effect relates to the electric field enhanced thermal emission of charge carriers from charged traps. It is known that Si traps can be charged. Thus, it is possible that Si traps can efficiently emit charge carriers in silicon oxide with an applied electric field.

The current conduction mechanism in silicon nitride is well known. Typically current conduction in silicon nitride is a defect-assisted current conduction mechanism that is dominated by electrons jumping between geometrically close defects. This mechanism is described by the Frenkel-Poole equation.

For both $SiO_x$ and $Si_xN_y$ current carrying layers, the electric fields required to supply the appropriate leakage (strip) current to support the channel emissive layer re-charge is at least two orders of magnitude higher ($10^6$ vs. $10^4$ V/cm) than the known MCP bias supplies are capable of providing (1,000V vs. 100,000V). Bias voltages of 100,000V are not practical for the typical MCP application. Also, these high voltages will substantially increase the mean free path of the electrons within the channel. In addition, these high voltages will significantly reduce the number of collisions, and significantly reduce the resulting gain of the device. For these reasons, silicon oxide and silicon nitride based films will not function as resistive films for the MCP applications.

U.S. Pat. No. 7,097,526 entitled "Method of Forming Nitrogen and Phosphorus Doped Amorphous Silicon as Resistor for Field Emission Display Device Baseplate" to Raina describes using nitrogen or oxygen doping of silicon to increase the thin film resistance. This patent teaches that it is possible to change the conductivity of bulk amorphous silicon over a range of 500 to $10^4$ $\Omega$-cm by varying the nitrogen doping. Similarly, U.S. Pat. No. 6,268,229 entitled "Integrated Circuit Devices and Methods Employing Amorphous Silicon Carbide Resistor Materials" to Brandes et al. describes that amorphous silicon-carbide, through selection of the silicon-to-carbide ratio and concentrations of various dopants, can demonstrate resistivity in a range from 1 $\Omega$-cm to $10^{11}$ $\Omega$-cm. While it has been demonstrated that these films are capable of achieving the resistivity required for MCP operation, the films remain semiconducting and subject to the same previously identified problems that are observed for all semiconducting films. Moreover, the high resistivity range of those films was found to be very hard to reproduce between different experimental runs due to their extremely high sensitivity to any impurities, dopants, and grain dimensions.

The present invention relates to microchannel plate devices with continuous dynodes having widely tunable conductivity during fabrication. In one embodiment, the resistance of layers can be tuned over a range from about $10^9$-$10^{16}$ $\Omega$/sq. Film layers can also have electrical conductivity essentially similar to the ohmic electrical conductivity of metals. Films can also have a conductivity that is not affected by an applied external transverse electric field, a relatively small TCR value, and a resistance value that is stable as a function of applied bias.

In various embodiments of the present invention, the resistive layer, either alone or in conjunction with at least an emissive layer, are formed in each of the plurality of channels of the microchannel plates by various deposition techniques, such as atomic layer deposition. One skilled in the art will appreciate that the methods of the present invention can be used with any type of microchannel plate substrate including conventional glass microchannel plates, semiconductor microchannel plates, ceramic microchannel plates and plastic microchannel plates.

Each of the plurality of channels in the microchannel plate according to the present invention includes at least a resistive and an emissive layer or a combined emissive/resistive layer. Microchannel plates according to the present invention can include a resistive layer combined with any number of emissive layers formed on the channels. In various embodiments, other resistive layers can be formed on the outer surface of the plurality of channels, between emissive layers, and/or on the outer surface of the outer emissive layer. Also, in various embodiments, thin resistive layers can be formed on the outer surface of the plurality of channels, between emissive layers, and/or on the outer surface of the outer emissive layer. Various possible resistive and emissive layers are described in more detail in connection with FIG. 2.

Figure 2:
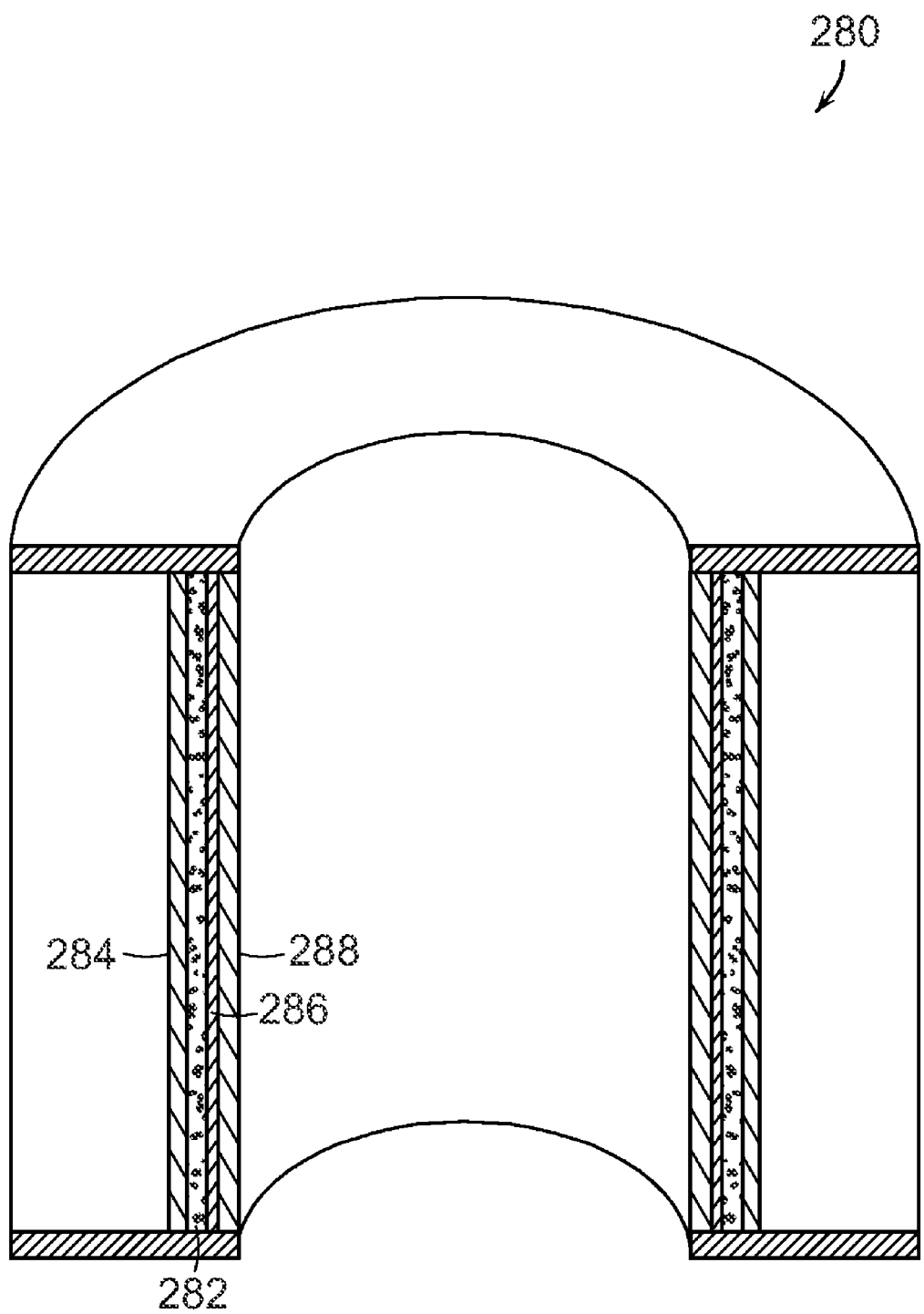
FIG. 2 illustrates a cross section of a single channel of a microchannel plate according to the present invention.

FIG. 2 illustrates a cross section of a single channel 280 of a microchannel plate according to the present invention. A resistive layer 282 is formed on the outer surface of the channel 280. The resistance of the resistive layer 282 can be tuned to achieve a predetermined level of conductivity during fabrication. In some embodiments, the resistive layer 282 is a nanolaminate structure, containing alternating thin films comprised of Aluminum Oxide ($Al_2O_3$) insulating layers stacked with zinc doped copper oxide nanoalloy (CZO) conducting films. Materials that comprise the conducting and insulating layers can be selected, for example, based upon the bandgap of candidate materials. Candidate materials can be divided into three primary groups, based upon bandgap: no-bandgap (metals); moderate bandgap (semi-conducting/semi-insulating); and large bandgap (insulators). For example, the no-bandgap materials can include: Ru, Rh, Pd, Re, Os, Ir, Pt, and Au. The moderate bandgap materials can include oxides of Zn, V, Mn, Ti, Sn, Ru, In, Cu, Ni, and Cd. The large bandgap materials can include oxides and nitrides of Al, Si, Mg, Sn, Ba, Ca, Sr, Sc, Y, La, Zr, Hf, Ta, Ti, V, Cs, B, Nb, Be, and Cr.

In various other embodiments, the conducting layer of the nanolaminate resistive layer 282 is formed using mid-bandgap materials, such as oxides of Zn, V, Mn, Ti, Sn, Ru, In, Cu, Ni, and Cd. The conducting layer can include any insulating oxide or nitride (large bandgap materials) doped with metallic (no-bandgap materials) species, such as Ru, Rh, Pd, Re, Os, Ir, Pt, and Au. In various embodiments, the insulating film used in the nanolaminate resistive layer 282 can be formed using very large bandgap materials, such as oxides and nitrides of: Al, Si, Mg, Sn, Ba, Ca, Sr, Sc, Y, La, Zr, Hf, Ta, Ti, V, Cs, B, Nb, Be, and Cr, and any mixture thereof. The nanolaminate structure can also include a resistive film, which can be a metal oxide alone or a nanoalloy. The resistive film can also be a doped semi-insulating oxide or a pure semi-insulating oxide.

The term "nanolaminate" is defined herein as a composite film of ultra thin layers of two or more materials in a layered stack, where the layers are alternating layers of materials of the composite film. For extremely thin alternating layers, the term "nanoalloy" is often used. However, the distinction between the term "nanolaminate" and the term "nanoalloy" is not clear in the art. The term "nanoalloy" as used herein describes films formed from extremely thin nanolaminates, which are no more than a few monolayers thick. Typically, each layer in a nanolaminate has a thickness in the few Angstrom range up to several nanometers. Each individual material layer of the nanolaminate can have a thickness that is as thin as a monolayer of the material.

For example, a nanolaminate of zinc doped copper oxide nanoalloy (CZO) and aluminum oxide includes at least one thin layer of CZO, and one thin layer of the aluminum oxide. Such a layer can be described as a nanolaminate of CZO/aluminum oxide. A CZO/aluminum oxide nanolaminate is not limited to alternating one CZO layer after an aluminum oxide layer, but can include multiple thin layers of CZO alternating with multiple thin layers of aluminum oxide. Furthermore, the number of thin layers of CZO and the number of thin layers of aluminum oxide can vary independently within a nanolaminate structure.

Additionally, CZO/aluminum oxide nanolaminate can include layers of different conducting and insulating oxides, where each layer is selected according to its insulating or conducting properties. A dielectric layer containing alternating layers of conducting oxides and insulating oxides has an effective conductivity that is related to the combination of the layers of the nanolaminate. The effective conductivity depends on the relative thicknesses of the conducting oxide layers and the insulating oxide layers. Thus, such a film containing a conducting oxide/insulating oxide nanolaminate can be engineered to effectively provide a predetermined resistance that can be varied over a wide range during fabrication.

The conductivity of the dynode film can also be modulated by doping the conducting film. The zinc doped copper oxide nanoalloy is an example of such a film, where the zinc content of the zinc doped copper oxide nanoalloy can be used to determine the conductivity of the zinc doped copper oxide nanoalloy. Thus doping may be used alone, or in conjunction with the nanolaminate, to engineer a selected film resistance.

In some embodiments, a thin barrier layer 284 is formed on the outer surface of the channel 280 before the first resistive layer 282 is formed. The thin barrier layer 284 can also be used to improve or to optimize MCP device functions, such as secondary electron emission, gain, uniformity, lifetime, and/or process yield. The thin barrier layer 284 can also be used to achieve a predetermined current output of the microchannel plate. The thin barrier layer 284 can also be used to control charge trapping characteristics of the MCP. In addition, the thin barrier layer 284 can be used to passivate the outer surface of the channel 280 to prevent ions from migrating out of the surface of the channel 280.

The electrostatic fields maintained within the microchannel plate that move electrons through the channel 280 also move any positive ions that migrate through the channel 280 towards a photocathode or other up-stream device or instrument used with the microchannel plate. These positive ions include the nucleus of gas atoms which can be of considerable size, such as hydrogen, oxygen, and nitrogen. These gas atoms are much more massive than electrons. Such positive ions can be accelerated toward the channel entrance and even farther to impact other components which may be used in concert with the MCP. An example of such a device is the image intensifier tube component of night vision devices which uses a photocathode (typically GaAs) to generate electrons which are amplified by the MCP to provide low light imaging. Ion impact upon the photocathode causes physical and/or chemical damage or can modify the electron affinity of the surface crucial for efficient photoconversion. The same ions or other atoms present within the channel 280 or proximate to the photocathode may destroy the negative electron affinity of the photocathode required for high efficiency and/or may be effective to chemically combine with and poison the photocathode.

In addition, the channel 280 includes an emissive layer 288 that is formed over the resistive layer 282 or over the barrier layer 286. In various embodiments, the emissive layer 288 comprises oxides and nitrides of at least one element selected from the group consisting of: Al, Si, Mg, Sn, Ba, Ca, Sr, Sc, Y, La, Zr, Hf, Ta, Ti, V, Cs, B, Nb, Be, Cr, and any mixture thereof. In some embodiments, the thickness and material properties of the emissive layer 288 are generally chosen to increase the secondary electron emission efficiency of the microchannel plate compared with conventional microchannel plates fabricated with the lead-glass, multi-draw process. In some embodiments, the thickness and material properties of the emissive layer 288 are generally chosen to provide a barrier to ion migration. Such a barrier to ion migration can be used to control charge trapping characteristics.

FIG. 2 illustrates a microchannel plate with resistive and emissive layers 282, 288. However, one skilled in the art will understand that microchannel plates can be fabricated according to the present invention with any number and combination of resistive and emissive layers. In such embodiments, there are many possible combinations of different emissive and resistive layer compositions and thicknesses. In addition, the multiple resistive and emissive layers can be stacked with or without barrier layers.

Experiments have shown that depositing resistive films by atomic layer deposition (ALD) significantly enhances the performance of the microchannel plate. Atomic layer deposition has been shown to be effective in producing highly uniform, pinhole-free films having thicknesses that are as thin as a few Angstroms. Films deposited by ALD have relatively high quality and high film integrity compared with other deposition methods, such as physical vapor deposition (PVD), thermal evaporation, and chemical vapor deposition (CVD), especially taking into account large aspect ratios of MCP pores.

Atomic Layer Deposition is a chemical process used to create extremely thin coatings. Atomic layer deposition is a variation of CVD that uses a self-limiting reaction. The term "self-limiting reaction" is defined herein to mean a reaction that limits itself in some way. For example, a self-limiting reaction can limit itself by terminating after a reactant is completely consumed by the reaction or once the reactive sites on the deposition surface have been occupied.

A cycle of an ALD deposition sequence includes pulsing a precursor material, completely evacuating the chamber with the assistance of an inert purging gas, pulsing a reactant precursor, and then completely evacuating the chamber of the reactant precursor using an inert purge gas. The result of an ALD deposition sequence is a very consistent deposition thickness that depends upon the amount of the first precursor that adsorbs onto and then saturates the surface. This cycle can be repeated until the desired thickness is achieved in a single material layer. This cycle can also be alternated with pulsing a third precursor material, completely evacuating the chamber of the reactant precursor using an inert purge gas for the third precursor, pulsing a fourth reactant precursor, and then completely evacuating the chamber of the reactant precursor using an inert purge gas. In some methods of the present invention, there does not need to be a reactant gas if the precursor material interacts with the substrate directly. For example, in one embodiment of the present invention, the ALD deposition sequence includes pulsing dopant metal precursor material onto a conducting oxide layer.

Nanolayer and nanolaminate materials are composite materials that include ultra-thin layers of two or more different materials in a layered stack, where the layers are alternating layers of different materials having a thickness that is on the order of a nanometer or less. Nanolayer and nanolaminate materials may be continuous films that are a single monolayer thick. Nanolayer and nanolaminate materials are formed when the thickness of the first series of cycles results in a layer that is only a few molecular layers thick, and the thickness of the second series of cycles results in a different layer that is only a few molecular layers thick.

Nanolayer and nanolaminate materials are not limited to alternating single layers of each material. Instead, nanolayer and nanolaminate materials can include several layers of one material alternating with a single layer of the other material that form a desired ratio of the two or more materials. Such an arrangement can achieve a film having a conductivity that varies over a wide range. Nanolayer and nanolaminate materials can also include several layers of one material formed by an ALD reaction either over or under a single layer of a different material formed by another type of reaction, such as a MOCVD reaction. The layers of different materials may remain separate after deposition, or they may react with each other to form an alloy layer. The alloy layer can be a doping layer. Doping the layer can be used to vary the properties of the layer.

Nanolaminate zinc-doped copper oxide (CZO) films can be formed by ALD deposition using an alkyl-type precursor chemical, such as Diethylzinc (DEZ), an acetonate-type precursor, such as Copper (II) hexaflouroacetylacetonate hydrate, or $Cu(hfac)_2$, and an oxidizing precursor, such as De-ionized (DI) water. Such films can be formed at relatively low temperatures, which can be 250° C. or lower. Such films can be amorphous or polycrystalline and possess smooth surfaces. Such films may provide enhanced electrical properties as compared to films formed with physical deposition methods, such as sputtering, or typical chemical layer depositions, due to their relatively smooth surface and reduced damage which results in more repeatable electrical performance.

In one embodiment, a $CZO/Al_2O_3$ nanolaminate resistive layer is formed using atomic layer deposition (ALD). Such a film has a relatively smooth surface relative to other processing techniques. The transitions can be controlled during the formation of such a film by using atomic layer deposition. Thus, the deposited $CZO/Al_2O_3$ nanolaminate layers can be engineered to provide the required electrical or physical characteristics. In addition, the ALD deposited $CZO/Al_2O_3$ nanolaminate layers provide conformal coverage on the surfaces on which they are deposited.

Another aspect of the microchannel plates of the present invention is that the resistive layer 282 and any other resistive and emissive layers formed on the substrate 280 protect and passivate the substrate 280. That is, the resistive layer 282 and any other resistive and emissive layers formed on the substrate layer 280 can provide a barrier to ion migration that can be used to control outgassing characteristics. Conventional resistive and emissive layers can be easily damaged.

In glass microchannel plates, the alkaline metals contained in the Pb-glass formulation are relatively stable in the bulk material. However, alkaline metals contained in the reduced lead silicate glass (RLSG) on the outer surface of the microchannels which forms the emissive layer are only loosely held within the film structure because of their exposure to the high temperature hydrogen environment that removes oxygen and breaks bonds in material structure. The electron bombardment that occurs during electron multiplication erodes these elements from the film. This erosion degrades the gain of the microchannel plate over time. In silicon microchannel plates, the emissive layer is typically a very thin coating that also erodes during electron bombardment which occurs during normal device operation. One aspect of the present invention is that resistive and emissive can be engineered to better withstand the effects of electron bombardment and thus to increase the device stability and lifetime.

Thus, in various embodiments, at least one of a thickness and a composition of the resistive layer can be chosen to passivate the microchannel plate so that the number of ions released during initial operation (outgassing of ion species, such as H, CO, $CO_2$, and $H_2O$) as well as longer term removal of adsorbed alkali metals, such as Na, K, and Rb from the substrate is reduced. Reducing the number of ions released from the substrate will improve the lifetime of the microchannel plate as well as the lifetime of devices which utilize the MCP in combination with a photocathode. Photocathodes are particularly susceptible to ion poisoning from outgassed or desorbed ions from the MCP. Choosing the thickness and the composition of the resistive layer to passivate the microchannel plate substrate will also improve the process yield.

Another aspect of the microchannel plates of the present invention is that the resistive and emissive layers 282, 288 can be optimized independently of each other. The resistive and emissive layers 282, 288 can also be optimized independently of other microchannel plate parameters to achieve various performance, lifetime, and yield goals. For example, the resistive layer 282 can be optimized to enable a specific output current operating range. The secondary electron emission layers 288 can be optimized separately to achieve high or maximum secondary electron emission efficiency or high or maximum lifetime and/or have high count rate capabilities. Such a microchannel plate can have significantly improved microchannel plate gain, count rate, and lifetime performance compared with prior art microchannel plate devices.

The ability to independently optimize the various resistive and emissive layers is important because the performance of microchannel plates is determined by the properties of these combined layers that form the continuous dynodes in the channels. The continuous dynodes must have emissive and resistive surface properties that provide at least three different functions. First, the continuous dynodes must have emissive surface properties desirable for efficient electron multiplication. Second, the continuous dynodes must have conductive properties that allow the emissive layer to support a current adequate to replace emitted electrons. Third, the continuous dynodes must have resistive properties that allow for the establishment of an accelerating electric field for the emitted electrons.

Consequently, the performance of these three functions: emitting secondary electrons; replacing emitted electrons; and establishing an accelerating electric field for the emitted electrons, cannot typically be simultaneously maximized within the current, state-of-the-art MCP technology that utilizes a single, combined RLSG resistive and emissive layer. Thus, in prior art single emissive layer microchannel plate devices, the secondary emission properties of the emissive layer cannot be optimized to maximize secondary electron emission and, therefore, cannot be optimized to maximize the sensitivity performance of the microchannel plates. In fact, most known microchannel plates are fabricated to optimize the resistance of the device over a very narrow range that is determined by the macroscopic material composition of the glass, rather than to optimize the secondary electron emission. The method of the present invention allows the various resistive and emissive layers to be independently optimized for one or more performance, lifetime, or yield goal.

Figure 3A:
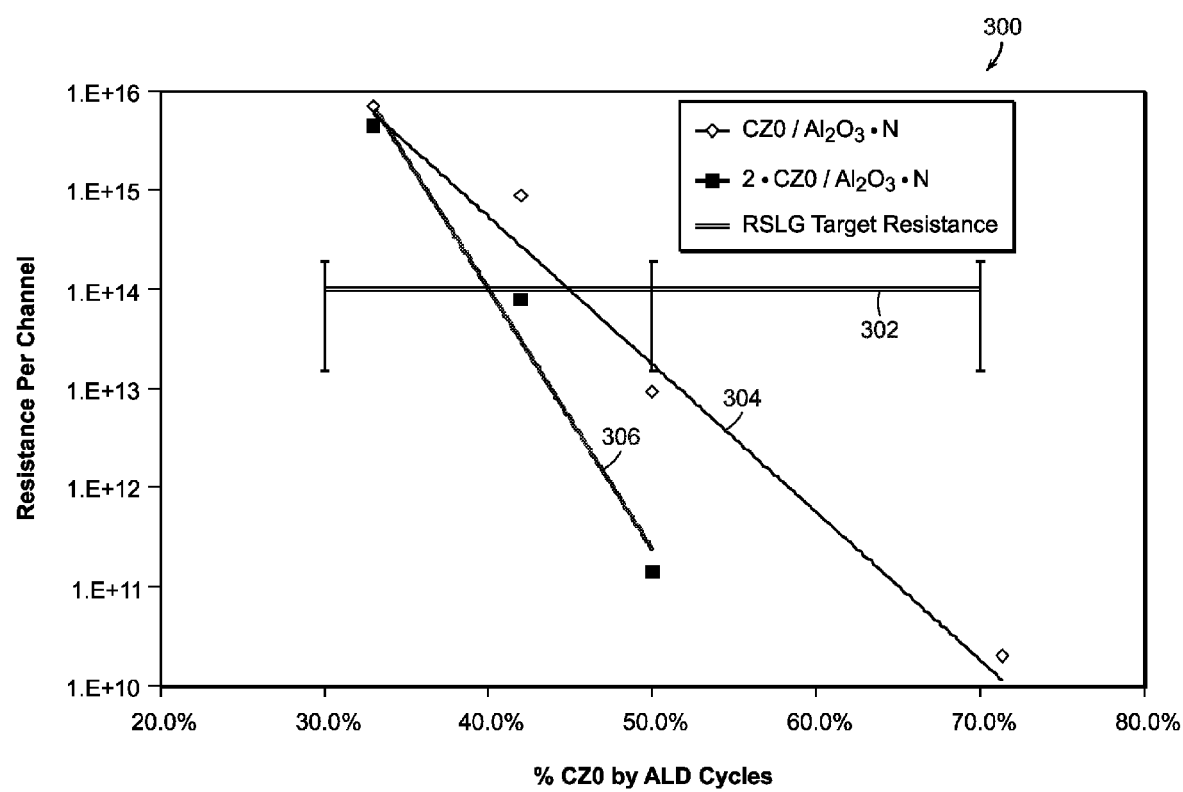
FIG. 3A presents experimental data for resistance per channel as a function of percent CZO by ALD cycles for films deposited according to the present invention and for channel resistance of conventional microchannel plates.

FIG. 3A presents experimental data 300 for resistance per channel as a function of percent CZO by ALD cycles for films deposited according to the present invention and for channel resistance of conventional microchannel plates. Resistance per channel data 302 for conventional microchannel plates is presented for conventional state-of-the-art microchannel plates having a single, combined resistive and emissive layer. The data 302 indicate that the resistance per channel is about $10^{14}$. These data were taken for a manufactured microchannel plate device that is commonly used in state-of-the-art night vision devices.

FIG. 3A also presents data 304 for resistance per channel as a function of percent CZO by ALD cycles for an alternating combination of $(CZO/Al_2O_3) \times N$ layers of resistive films deposited according to the present invention. In addition, data 306 are presented for resistance per channel as a function of percent CZO by ALD cycles for an alternating combination of $CZO \times 2$ layers/$Al_2O_3 \times N$ layers resistive film deposited according to the present invention.

In order to present a fair comparison, the data 304, 306 was obtained for the same conventional microchannel plate devices with the resistance per channel data 302 shown in FIG. 3A, but where processing was terminated immediately prior to the hydrogen reduction step that would have resulted in the simultaneous formation of the resistive and emissive layers. Resistive and emissive layers were then formed according to the present invention. The data 300 demonstrates the wide possible range of channel conductivity that can achieved using the methods of the present invention compared with prior art microchannel plate fabrication methods.

Figure 3B:
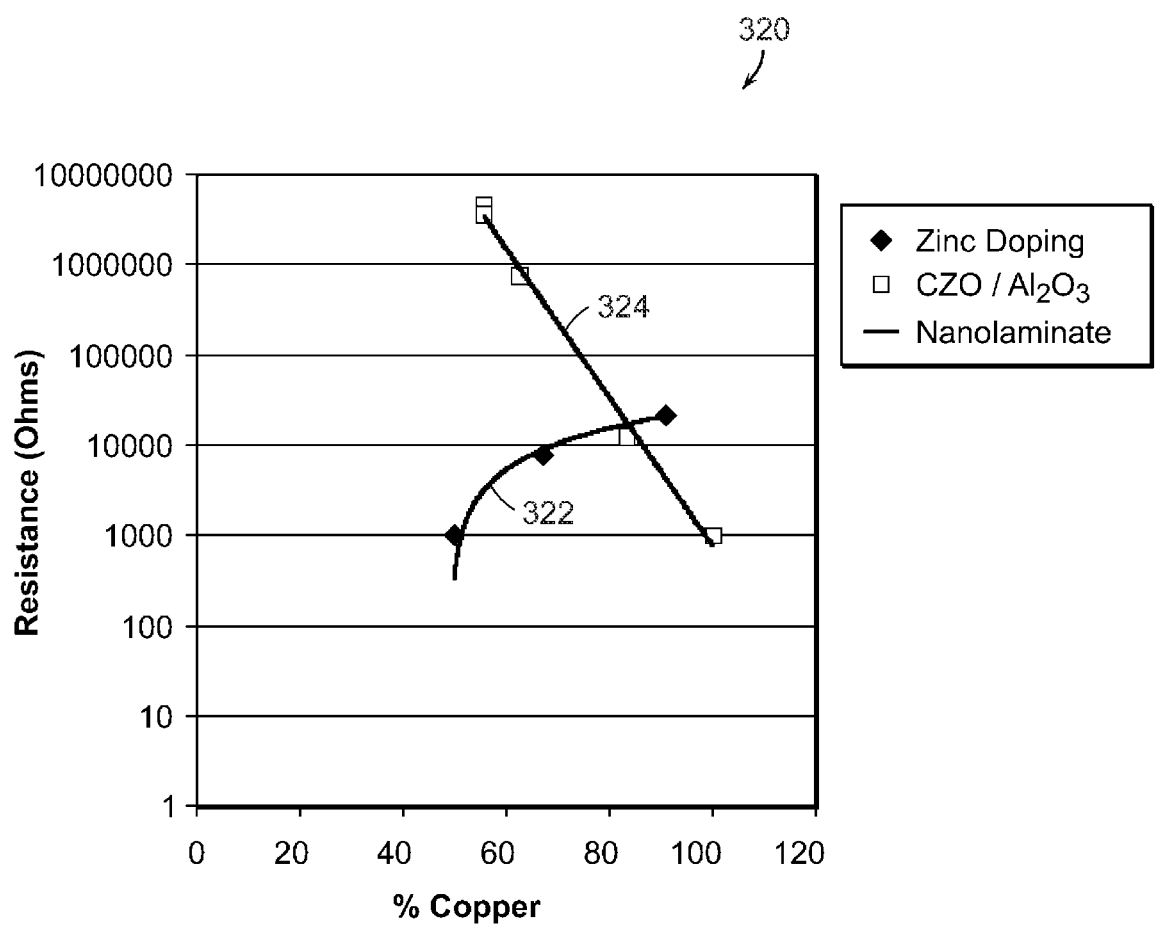
FIG. 3B presents data for resistance as a function of percent copper for films fabricated according to the present invention.

FIG. 3B presents data 320 for resistance as a function of percent copper for films fabricated according to the present invention. Data 322 is presented for zinc doped copper oxide (CZO) films. The data 322 indicate that by modulating the percent of zinc contained in the zinc doped copper oxide nanoalloy film according to the present invention, it is possible to vary the resistance over nearly two orders of magnitude. Data 324 is also presented for $CZO/Al_2O_3$ nanolaminate films fabricated according to the present invention. The data 324 indicate that by fixing the percentage of zinc within the CZO film and by varying the $CZO/Al_2O_3$ nanolaminate ratios according to the present invention, it is possible to achieve a much wider range of resistivity. The range in this experiment is limited by test structure design, to an upper value which is much less that that shown in FIG. 3A.

Figure 3C:
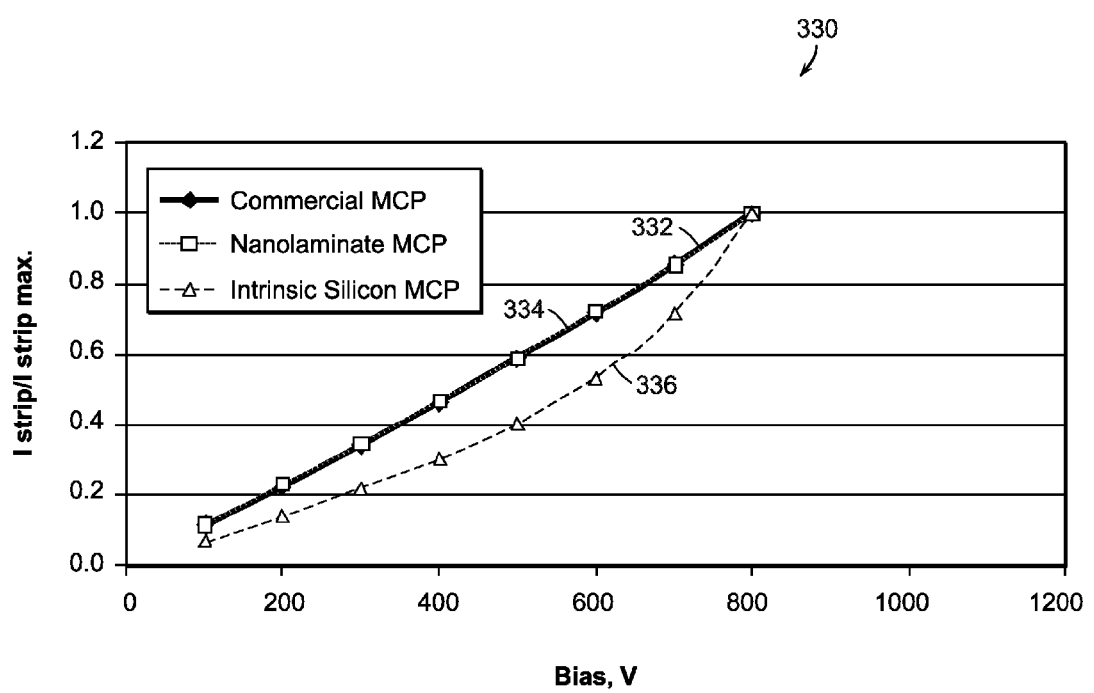
FIG. 3C presents data for normalized microchannel plate current as a function of voltage for a commercial microchannel plate device, an intrinsic silicon microchannel plate device, and for a microchannel plate device with a nanolaminate resistive layer deposited according to the present invention.

FIG. 3C presents data 330 for normalized microchannel plate current as a function of voltage for a commercial RLSG microchannel plate device, an intrinsic silicon microchannel plate device, and for a microchannel plate device with a nanolaminate resistive layer deposited according to the present invention. Normalized current-voltage data 332 is presented for a commercial RLSG microchannel plate device. Normalized current-voltage data 334 is presented for a microchannel plate device with a nanolaminate resistive layer deposited according to the present invention.

The normalized current-voltage data 332 for the commercial RLSG microchannel plate and the normalized current-voltage data 334 for the microchannel plate device with the nanolaminate resistive layer deposited according to the present invention shows a nearly identical linear normalized current-voltage characteristic. The nearly linear data characteristic suggests that both the commercial device and the device with the nanolaminate resistive layer according to the present invention demonstrate ohmic behavior by possessing a nearly identical and substantially constant resistance as a function of applied voltage. The inherent stability of resistance of the nanolaminate resistive layer deposited according to the present invention is due to the ability to tailor the conduction of the resistive layer using the combined nanolaminate/nanoalloy microstructure described herein.

Normalized current-voltage data 336 is presented for an intrinsic silicon microchannel plate device. The non-ohmic behavior shown by the data 336 suggests that the intrinsic silicon microchannel plate shows a resistance that is not substantially constant as a function of applied voltage, which can be attributed to thermal and electric field effects which alter the conductivity of the semiconducting intrinsic silicon dynode.

Figure 3D:
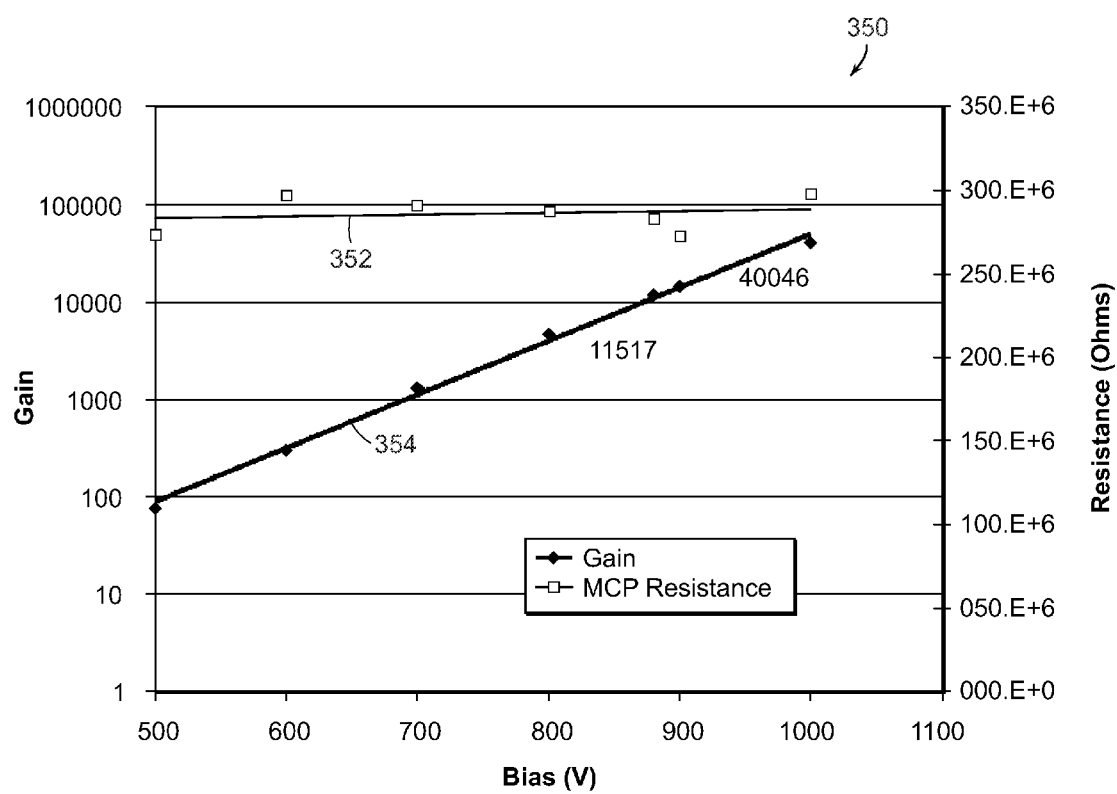
FIG. 3D presents data for both microchannel plate gain and for resistance as a function of bias voltage for microchannel plates with resistive layers fabricated according to the present invention.

FIG. 3D presents data 350 for both microchannel plate gain and for resistance as a function of bias voltage for microchannel plates with resistive layers fabricated according to the present invention. The microchannel plate devices include channels having a diameter that is about 5 microns and an L/D ratio that is equal to about 50:1. The data were acquired by varying the bias voltage from 500 to 1,000V with a constant input current.

Data 352 is presented for microchannel plate resistance as a function of bias voltage for a microchannel plate with resistive layers fabricated according to the present invention. Data 354 is presented for microchannel plate gain as a function of bias voltage for a microchannel plate with a resistive layer fabricated according to the present invention. The data 352, 354 indicate that the microchannel plate devices according to the present invention achieve a stable resistance across the operating voltage and a higher gain for equivalent bias and input conditions compared with prior art microchannel plate devices.

Figure 3E:
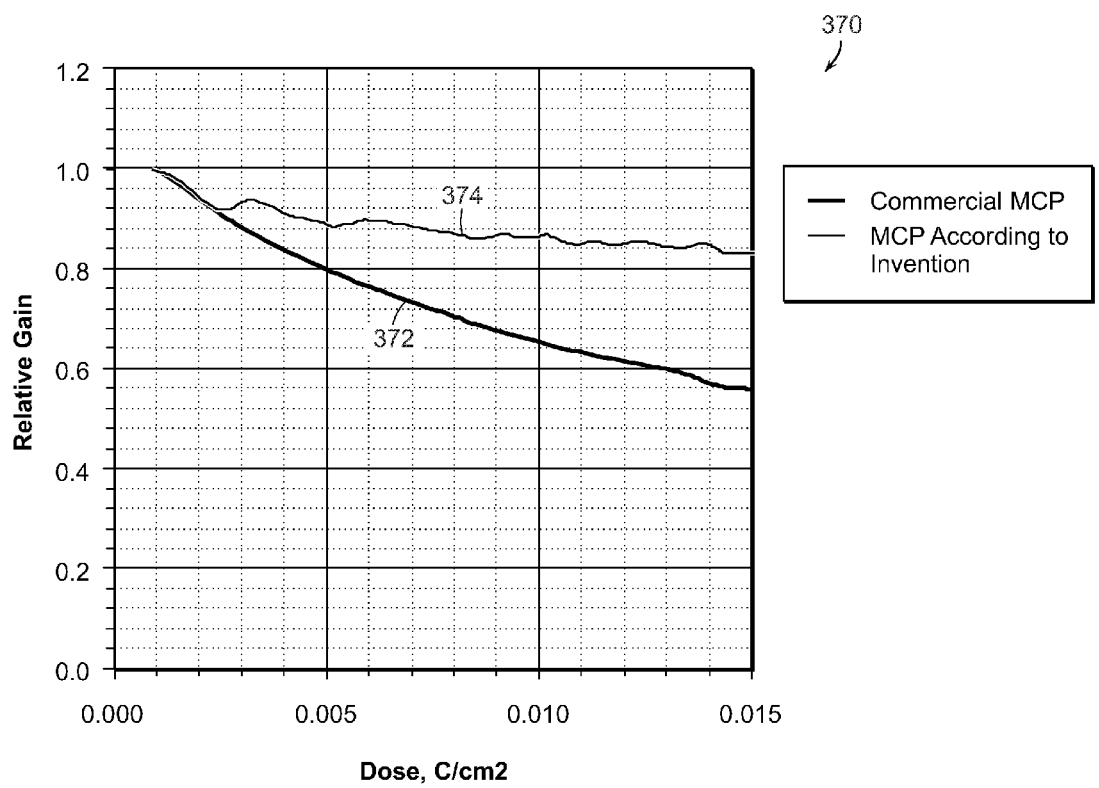
FIG. 3E presents data for relative gain as a function of dose in $C/cm^2$ for a commercial microchannel plate and for a microchannel plate with a resistive layer fabricated according to the present invention.

FIG. 3E presents data 370 for relative gain as a function of dose in $C/cm^2$ for a commercial RLSG microchannel plate and for a microchannel plate with a resistive layer fabricated according to the present invention. Data 372 is presented for relative gain data as a function of the total extracted charge density in coulombs/$cm^2$ for the commercial RLSG microchannel plate. Data 374 is presented for relative gain data as a function of the total extracted charge density in coulombs/$cm^2$ for a microchannel plate with a resistive layer fabricated according to the present invention.

The data 372, 374 demonstrate the enhanced lifetime observed with the combined resistive and emissive films fabricated according to the present invention, as compared with lifetime data collected using present state-of-the-art microchannel plate technology. The relative gain degradation data indicate that there is significantly less gain degradation for microchannel plates having a resistive and emissive layer fabricated according to the present invention as a function of the total extracted charge. Thus, the gain degradation data indicate that fabricating the resistive and emission layers according to the present invention can significantly improve microchannel plate device lifetimes.

Figure 3F:
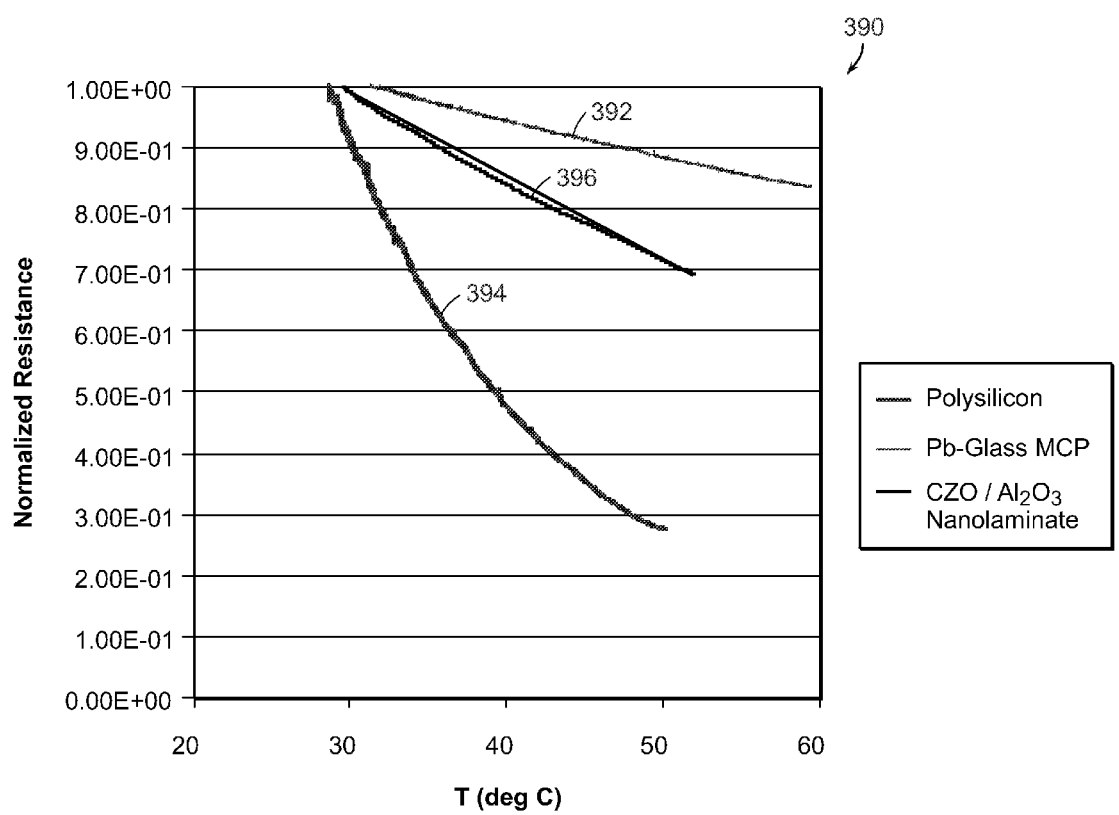
FIG. 3F presents data for normalized resistance as a function of temperature observed with the resistive film for a state-of-the-art commercial reduced lead silicate glass (RLSG) microchannel plate device, intrinsic polysilicon, and for a microchannel plate device fabricated according to the present invention.

FIG. 3F presents data 390 for normalized resistance as a function of temperature observed with the resistive film for a state-of-the-art commercial reduced lead silicate glass (RLSG) microchannel plate device, intrinsic polysilicon, and for a microchannel plate device fabricated according to the present invention. Data 392 is presented for the resistive film for a state-of-the-art commercial RLSG microchannel plate device. Data 394 is presented for intrinsic polysilicon. Data 396 is presented for a microchannel plate device fabricated according to the present invention.

The data 392 and 396 indicate that the temperature coefficient of resistance for the microchannel plate device fabricated according to the present invention is comparable to the temperature coefficient of resistance for the commercial RLSG microchannel plate device. The temperature coefficient of resistance of both the present invention and the RLSG device is less than 1% per degree C., which exhibits ohmic or "metallic" conduction behavior that significantly exceeds the temperature coefficient of resistance performance of the intrinsic polysilicon, which is more than 8% per degree C.

In another aspect of the present invention, plastic microchannel plate detectors that are neutron sensitive are fabricated with the resistive and emissive films of the present invention. These microchannel plate detectors indirectly detect neutrons. Neutrons interact through nuclear reactions inside the MCP or transfer their energy to short range charged particles, such as protons and alpha particles. These secondary particles are used to produce measurable electrical signals.

Figure 4C:
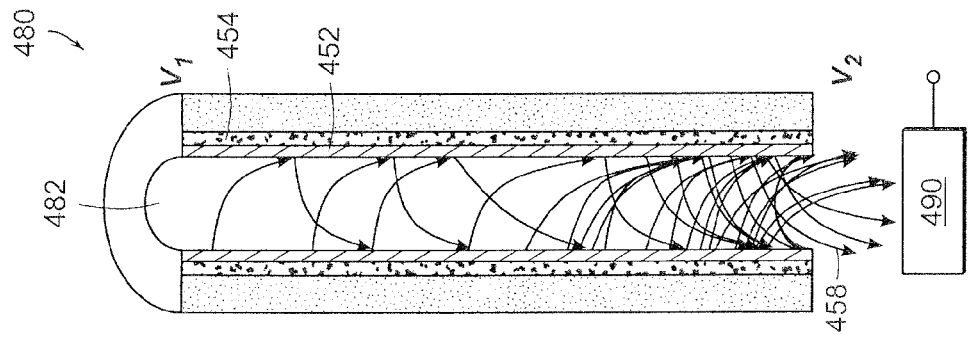
FIG. 4C illustrates a schematic diagram of the electron avalanche process in a single plastic microchannel of a plastic microchannel plate according to the present invention.
Figure 4B:
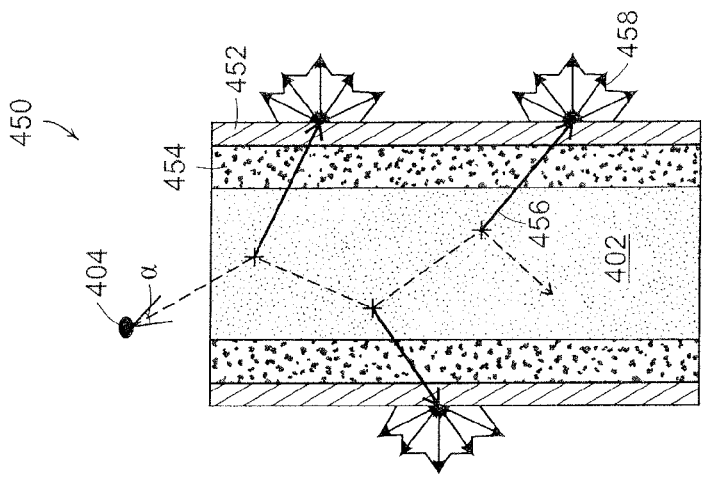
FIG. 4B illustrates a schematic view of a cross-sectional diagram of a single microchannel of the plastic microchannel plate shown in FIG. 4A that illustrates the neutron-proton interaction and secondary electron generation within the microchannel plate.
Figure 4A:
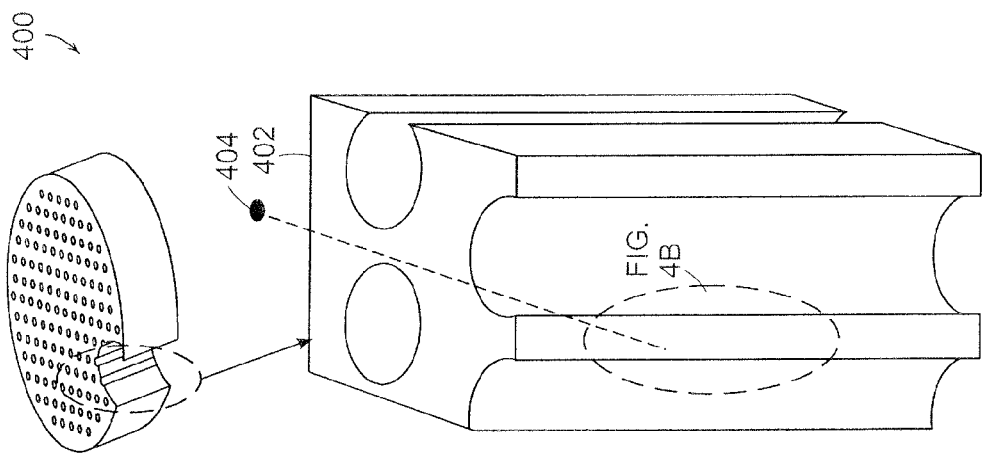
FIG. 4A illustrates a schematic diagram of a plastic microchannel plate comprising a substrate suitable for detecting fast neutrons according to the present invention.

FIG. 4A illustrates a schematic diagram of a plastic microchannel plate 400 comprising a substrate 402 suitable for detecting fast neutrons 404 propagating in the center of a cone angle α according to the present invention. The plastic substrate 402 defines a plurality of pores or microchannels that extend through the substrate 402 as described in connection with FIG. 1A. Plastic microchannel plate substrates containing high hydrogen concentrations provide relatively high efficiency for the neutron-proton recoil reaction. Resistive and emissive films are deposited on the walls of the plurality of microchannels as described herein. The composition and thickness of the resistive and emissive thin films can be optimized to provide optimal pore resistance and secondary electron emission.

FIG. 4B illustrates a schematic view of a cross-sectional diagram of a single microchannel 450 of the plastic microchannel plate 400 shown in FIG. 4A that illustrates the neutron-proton interaction and secondary electron generation within the microchannel plate The cross-sectional diagram of the microchannel 450 shows the resistive film 454 deposited on the surface of the microchannel 450. In addition, the cross-sectional diagram 450 shows the emissive film 452 deposited on the resistive film 454. The plastic microchannel plate 400 is designed to detect fast neutrons with energies that are greater than 0.1 MeV.

The cross-sectional diagram of the microchannel 450 shows that the fast neutrons 404 interact with the plastic substrate 402 through a neutron-proton (n-p) recoil reaction that generates recoil protons 456. The recoil protons 456 generated in the bulk plastic substrate material can reach the surface of the microchannel 450 and interact with the emissive and/or resistive films thereby releasing secondary electrons 458. The secondary electrons 458 initiate an electron avalanche process in the microchannel plate 400 as shown in FIG. 4C. In some embodiments, an electron amplifier 490 having an input that is coupled to the output of the microchannel 487 is used to amplify the amplified signal related to the detection of both thermal neutrons and fast neutrons.

FIG. 4C illustrates a schematic diagram of the electron avalanche process in a single plastic microchannel 480 of a plastic microchannel plate according to the present invention. The microchannel 480 shows the emissive film 452 and the resistive film 454 described in connection with FIG. 4B. Once the secondary electrons 458 are produced in the microchannel, the process of amplification and detection is identical to the standard operation of a microchannel plate device as implemented in low flux applications.

A plastic microchannel plate fabricated according to the present invention can form a fast neutron detector with background counting rates at levels that are lower than 0.01 count/cm2/sec. Such background counting rates are significantly lower than background counting rates of current state-of-the-art glass microchannel plates. The improved performance is due, at least in part, to the absence of heavy metals and radioactive traces, such as Rb and K, within the plastic substrates. The timing resolution of a plastic microchannel plate fast neutron detector fabricate according to the present invention will only be limited by the depth of neutron absorption and the speed of neutron propagation. Timing resolution can be better than 10 ns in these devices.

The detection efficiency of the plastic microchannel plate according to the present invention is a function of the composition, such as the concentration of hydrogen, and the geometry (thickness, pore diameter, and wall thickness) of the plastic substrate. In some embodiments, it is desirable to maximize the concentration of hydrogen. However, as the concentration of hydrogen increases, the glass transition temperature of the plastic reduces. Therefore, the maximum concentration of hydrogen is limited by the required processing temperatures for depositing the resistive layer, emissive layer, top electrode and bottom electrode. The fast neutron detection efficiency can be tailored for specific applications and can reach levels as high as 10% or greater for some designs.

Figure 5:
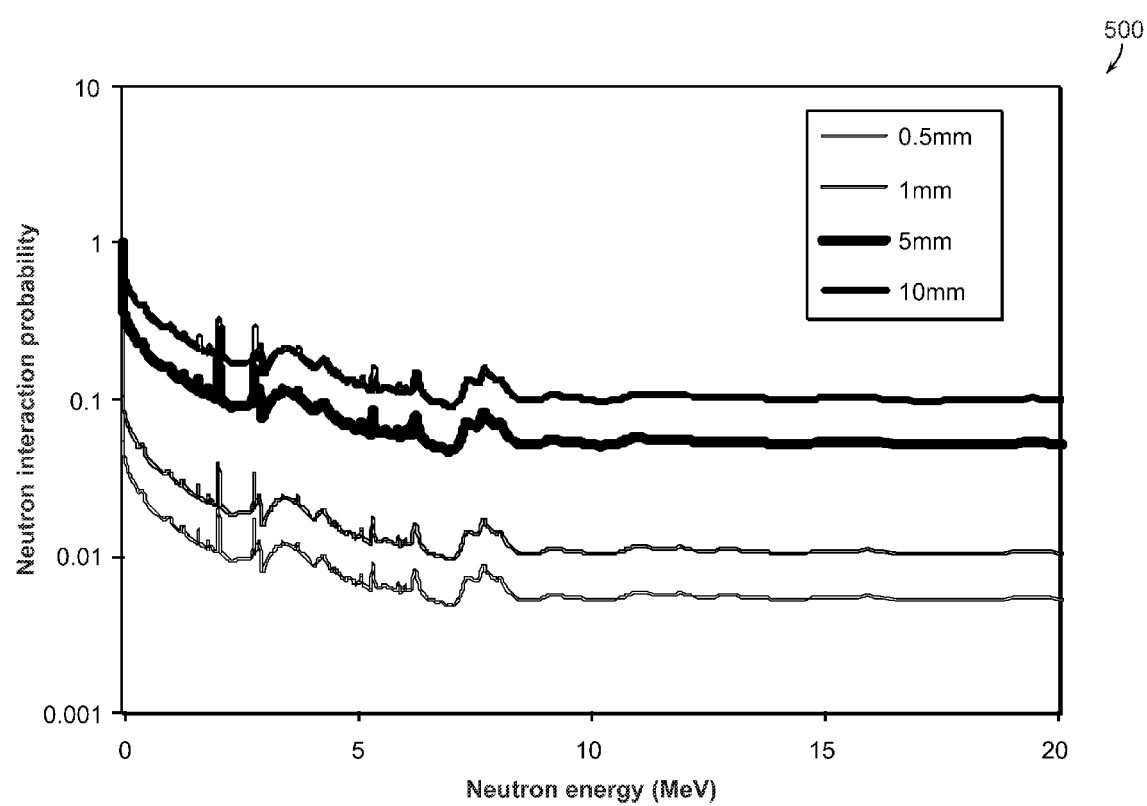
FIG. 5 illustrates graphs of neutron interaction probability as a function of neutron energy in MeV for four different plastic substrate thicknesses.

FIG. 5 illustrates graphs 500 of neutron interaction probability as a function of neutron energy in MeV for four different plastic substrate thicknesses. The graphs 500 indicate that thicker plastic substrate thicknesses have greater neutron interaction probabilities. For example, the graphs 500 indicate that plastic substrates with a 5 mm thickness have neutron interaction probabilities for fast neutrons that range from about 50% for low energies to approximately 10% for energies greater than 5 MeV. However, the detection efficiency for low energy range fast neutrons will be reduced by the range of the recoil protons in the plastic. Therefore, optimization of MCP geometry and hydrogen concentration is required in order to achieve the optimal performance.

Thus, plastic microchannel plates according to the present invention can directly detect fast neutrons with low gamma sensitivity. Such a capability is not possible with conventional thermal neutron-based (He-3, 10B-doped) microchannel plate devices. Thermal neutron detectors, when used in this application, require moderation of the fast neutrons, which substantially reduces the event counting rates and effectively destroys any spatial information about the original fast neutron. Also, the absence of heavy elements in plastic MCP substrates makes them very insensitive to gamma ray background radiation compared to conventional glass-based MCPs.

There are many possible designs for plastic microchannel plate devices according to the present invention. For example, in one embodiment, a highly directional fast neutron detector is fabricated with the plastic microchannel plate devices according to the present invention. Highly directional plastic microchannel plate detectors can be achieved by forming the microchannels with a bias angle and then rotating the microchannels through an angular range. Only neutrons that strike the walls of the microchannels will be detected. Thus, the sensitivity to incoming radiation is greatly reduced for neutrons arriving in very narrow cone angles, which are defined by the microchannel bias angle. Such directional plastic microchannel plate detectors can still be capable of detecting fast neutrons arriving in a wide range of angles. Numerous other approaches can be used to create directional fast neutron detectors. For example, the microchannel plate can be scanned along various angles relative to the neutron source. In some embodiments, microchannel plates are positioned in series to increase directionality. Such directional microchannel plate devices can be used to locate a neutron source for various applications including homeland security applications.

Figure 6:
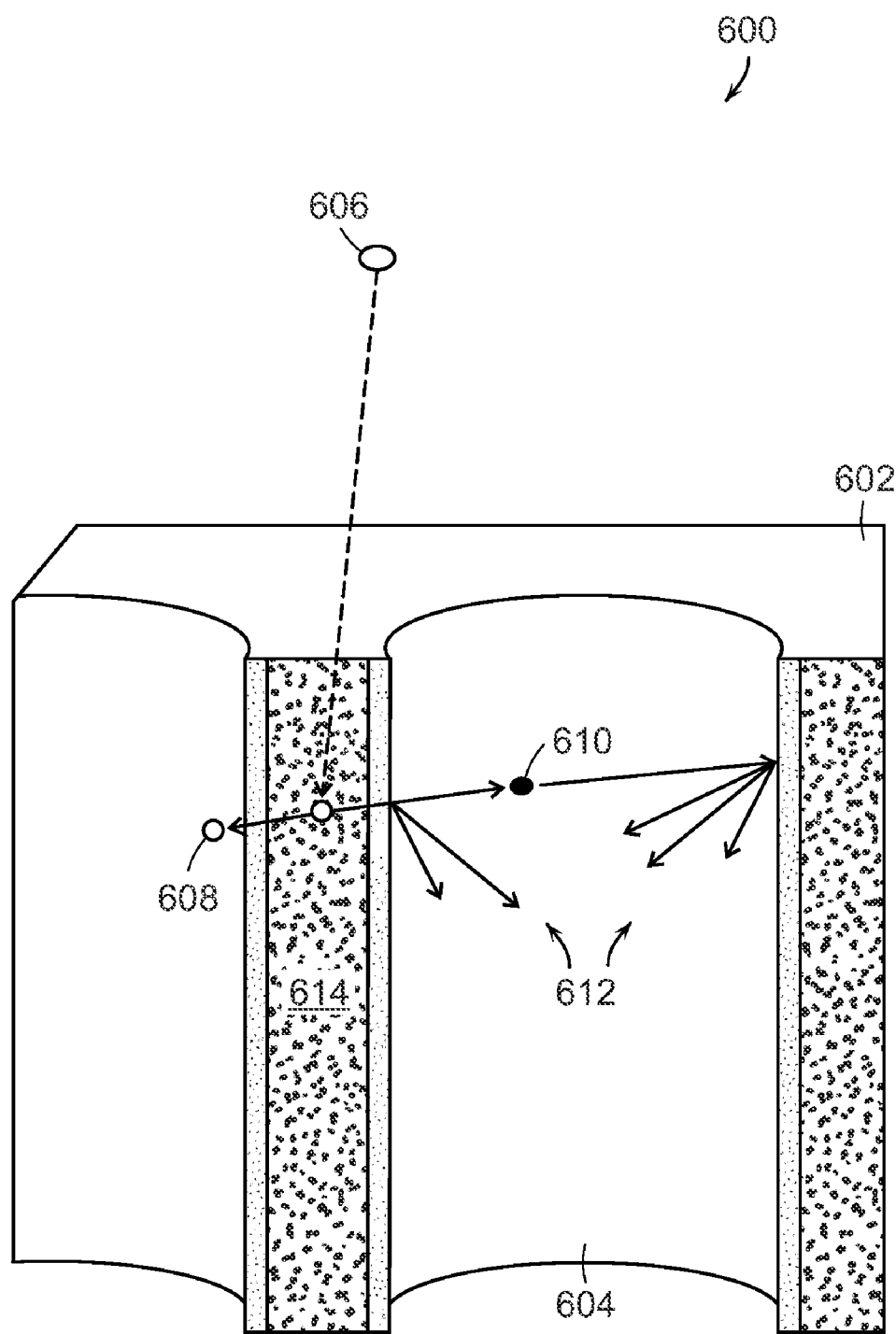
FIG. 6 illustrates a schematic view of a cross-sectional diagram of a plastic microchannel plate doped with Boron and the interaction of an incident thermal neutron with a $^{10}B$ nucleus to produce a $^7Li$ ion and an alpha particle.

FIG. 6 illustrates a schematic view of a cross-sectional diagram of a plastic microchannel plate 600 doped with Boron and the interaction of an incident thermal neutron with a $^{10}$B nucleus to produce a $^7$Li ion and an alpha particle. In this embodiment, the plastic microchannel plates is doped with thermal and cold neutron sensitive elements, such as boron, lithium, or gadolinium, which sensitize the detector to thermal neutrons having average energies of about 0.025 eV and cold neutrons having energy of about 5 meV. The microchannel plate 600 includes a boron-doped plastic substrate 602 comprising a plurality of microchannels 604. A resistive film is deposited on the surface of each of the microchannels 604. An emissive film is deposited on the resistive film as described in connection with FIG. 4A.

FIG. 6 illustrates that an incident thermal neutron 606 interacts with a $^{10}$B nucleus 614 in the plastic substrate to produce a $^7$Li ion 608 and an alpha particle 610. The $^{10}$B nucleus 614 has a relatively large capture cross section. High energy alpha particles 610, which have energies that are on order of 1.47 MeV interact with the resistive and the emissive film layers to produce a large number of secondary electrons and ions (in turn producing secondary electrons) 612, which is typically more than twenty electrons. These secondary electrons are accelerated within the microchannel plate 600 in the usual manner to result in a signal amplifying cascade. The large number of secondary electrons 612 that are generated by the alpha particle 610 within the microchannel plate 600 are more than a factor of ten greater than the number of secondary electrons generated due to the neutron-proton recoil reaction of the fast neutrons.

Thus, it may be possible to distinguish the signal generated by the thermal neutrons from the signal that is generated by the fast neutrons by processing the signals generated by the plastic microchannel detector. For example, operation of the plastic neutron detector in a unity gain mode, whereby the detected signal is amplified in subsequent gain stages, allows for the signals to be processed to determine pulse amplitudes that can be used to distinguish the thermal neutron signals from the fast neutron signals. Many other methods of signal processing can also be used to distinguish the thermal neutron signals from the fast neutron signals.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, which may be made therein without departing from the spirit and scope of the invention.

What is claimed is:

1. A microchannel plate for detecting neutrons, the microchannel plate comprising:
   a) a hydrogen-rich polymer substrate that defines a plurality of channels extending from a top surface of the substrate to a bottom surface of the substrate, wherein neutrons interacting with the plurality of channels generate neutron-proton interaction products and secondary electrons;
   b) a top electrode positioned on the top surface of the substrate;
   c) a bottom electrode positioned on the bottom surface of the substrate;
   d) a resistive layer comprising a nanolaminate structure formed over an outer surface of the plurality of channels, the resistive layer providing ohmic conduction with a resistivity that is determined by a composition of the nanolaminate structure; and
   e) an emissive layer formed over the resistive layer, wherein the neutron-proton interaction products interact with the plurality of channels and the emissive layer to generate secondary electrons that cascade within the plurality of channels to provide an amplified signal related to the detection of neutrons.

2. The microchannel plate of claim 1 wherein the hydrogen-rich polymer substrate comprises between 2-6 weight percent hydrogen.

3. The microchannel plate of claim 1 wherein the hydrogen-rich polymer substrate comprises at least some plastic material.

4. The microchannel plate of claim 1 wherein the hydrogen-rich polymer substrate comprises polycarbonate.

5. The microchannel plate of claim 1 wherein the hydrogen-rich polymer substrate is doped with at least one of boron, lithium and gadolinium.

6. The microchannel plate of claim 1 wherein the plurality of channels is oriented so that a sensitivity to incoming radiation is greatly reduced for neutrons arriving in certain narrow cone angles.

7. The microchannel plate of claim 1 wherein the nanolaminate structure comprises a combination of a metal oxide conducting layer and an insulating layer.

8. The microchannel plate of claim 7 wherein the metal oxide conducting layer comprises an oxide of at least one element selected from the group consisting of Zn, V, Mn, Ti, Sn, Ru, In, Cu, Ni, and Cd.

9. The microchannel plate of claim 7 wherein the insulating layer comprises at least one oxide of at least one element selected from the group consisting of Al, Si, Mg, Sn, Ba, Ca, Sr, Sc, Y, La, Zr, Hf, Ta, Ti, V, Cs, B, Nb, Be, and Cr.

10. The microchannel plate of claim 7 wherein the insulating layer comprises at least one nitride of at least one element selected from the group consisting of Al, Si, Mg, Sn, Ba, Ca, Sr, Sc, Y, La, Zr, Hf, Ta, Ti, V, Cs, B, Nb, Be, and Cr.

11. The microchannel plate of claim 1 wherein the resistive layer comprises a metal oxide layer, wherein a doping of the metal oxide layer determines the resistivity.

12. The microchannel plate of claim 11 wherein the metal oxide layer comprises an alloy of an insulating oxide doped with at least one of an element from the group consisting of Ru, Rh, Pd, Re, Os, Ir, Pt, and Au.

13. The microchannel plate of claim 1 wherein at least one of the resistivity and a profile of the resistivity is chosen to achieve a desired current output of the microchannel plate.

14. The microchannel plate of claim 1 wherein the emissive layer comprises an oxide of at least one element selected from of the group consisting of Al, Si, Mg, Sn, Ba, Ca, Sr, Sc, Y, La, Zr, Hf, Ta, Ti, V, Cs, B, Nb, Be, and Cr.

15. The microchannel plate of claim 1 wherein the emissive layer comprises a nitride of at least one element selected of the group consisting of Al, Si, Mg, Sn, Ba, Ca, Sr, Sc, Y, La, Zr, Hf, Ta, Ti, V, Cs, B, Nb, Be, and Cr.

16. The microchannel plate of claim 1 wherein the resistive layer and the emissive layer comprise a single layer.

17. The microchannel plate of claim 1 wherein at least one of a thickness and composition of the resistive layer is chosen to passivate the plurality of channels so that a number of ions released from the plurality of channels is reduced.

18. A microchannel plate for detecting both thermal neutrons and fast neutrons, the microchannel plate comprising:
   a) a hydrogen-rich polymer substrate doped with at least one of boron, lithium, and gadolinium that defines a plurality of channels extending from a top surface of the substrate to a bottom surface of the substrate, wherein neutrons reacting with the substrate generate at least one of alpha particles, Li-6 nuclei, triton, gamma rays, recoil protons, and beta particles;
   b) a top electrode positioned on the top surface of the substrate;
   c) a bottom electrode positioned on the bottom surface of the substrate;
   d) a resistive layer comprising a nanolaminate structure formed over an outer surface of the plurality of channels, the resistive layer providing ohmic conduction with a resistivity being determined by a composition of the nanolaminate structure; and
   e) an emissive layer formed over the resistive layer, wherein the at least one of the alpha particles, Li-6 nuclei, triton, gamma rays, recoil protons, and beta particles generated by the interaction of the neutrons and the polymer substrate collide with the emissive layer to generate secondary electrons that cascade within the plurality of channels to provide an amplified signal related to the detection of both thermal neutrons and fast neutrons.

19. The microchannel plate of claim 18 further comprising a bias voltage power supply having an output that is electrically connected to a bias input of the microchannel plate, the bias voltage power supply generating a bias voltage that is chosen to achieve unity gain in the microchannel plate.

20. The microchannel plate of claim 18 further comprising an electron amplifier having an input that is coupled to an output of the microchannel plate, the electron amplifier further amplifying the amplified signal related to the detection of both thermal neutrons and fast neutrons.

21. The microchannel plate of claim 20 wherein the hydrogen-rich polymer substrate is doped with Boron-10 isotopes.

22. The microchannel plate of claim 18 further comprising a signal processor having an input that receives the amplified signal, the signal processor processing the amplified signal to distinguish signal components generated by thermal neutrons from signal components generated by fast neutrons.

23. The microchannel plate of claim 22 wherein the signal processor processes the amplified signal to distinguish thermal neutrons from fast neutrons by measuring amplitudes of various signal components.

24. The microchannel plate of claim 18 wherein the hydrogen-rich polymer substrate comprises at least some plastic material.

25. The microchannel plate of claim 18 wherein the hydrogen-rich polymer substrate comprises polycarbonate.

26. The microchannel plate of claim 18 wherein the hydrogen-rich polymer substrate is doped with Lithium-6 isotopes.

27. The microchannel plate of claim 18 wherein the hydrogen-rich polymer substrate is doped with gadolinium-157 isotopes.

28. The microchannel plate of claim 18 wherein the plurality of channels is oriented so that a sensitivity to incoming radiation is greatly reduced for neutrons arriving in certain narrow cone angles.

29. The microchannel plate of claim 18 wherein the nanolaminate structure comprises a combination of a metal oxide conducting layer and an insulating layer.

30. The microchannel plate of claim 18 wherein the resistive layer comprises a metal oxide layer, wherein a doping of the metal oxide layer determines the resistivity.

31. The microchannel plate of claim 18 wherein the resistive layer and the emissive layer comprise a single layer.

32. The microchannel plate of claim 18 wherein at least one of a thickness and composition of the resistive layer is chosen to passivate the plurality of channels so that a number of ions released from the plurality of channels is reduced.

33. A microchannel plate for detecting neutrons, the microchannel plate comprising:
   a) a hydrogen-rich polymer substrate that defines a plurality of channels extending from a top surface of the substrate to a bottom surface of the substrate, wherein neutrons interacting with the plurality of channels generate neutron-proton interaction products and secondary electrons;
   b) a top electrode positioned on the top surface of the substrate;
   c) a bottom electrode positioned on the bottom surface of the substrate;
   d) a resistive layer formed over an outer surface of the plurality of channels, the resistive layer providing ohmic conduction with a resistivity that is substantially constant, wherein at least one of a thickness and composition of the resistive layer is chosen to passivate the plurality of channels so that a number of ions released from the plurality of channels is reduced; and
   e) an emissive layer formed over the resistive layer, wherein the neutron-proton interaction products interact with the plurality of channels and the emissive layer to generate secondary electrons that cascade within the plurality of channels to provide an amplified signal related to the detection of neutrons.

* * * * *